United States Patent
Jauh et al.

(10) Patent No.: US 9,780,926 B2
(45) Date of Patent: Oct. 3, 2017

(54) BURST OFDMA SUPPORTING MU-MIMO

(71) Applicant: MEDIATEK INC., Hsinchu (TW)

(72) Inventors: Yuh-Ren Jauh, Taoyuan (TW);
Jianhan Liu, San Jose, CA (US);
Chao-Chun Wang, Taipei (TW);
James June-Ming Wang, San Marino, CA (US); Thomas Edward Pare, Jr., Mountain View, CA (US)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/833,072

(22) Filed: Aug. 22, 2015

(65) Prior Publication Data

US 2016/0014763 A1    Jan. 14, 2016

Related U.S. Application Data

(63) Continuation-in-part of application No. 14/794,680, filed on Jul. 8, 2015.
(Continued)

(51) Int. Cl.
*H04W 4/00* (2009.01)
*H04L 5/00* (2006.01)
*H04B 7/0452* (2017.01)

(52) U.S. Cl.
CPC ......... *H04L 5/0007* (2013.01); *H04B 7/0452* (2013.01); *H04L 5/0055* (2013.01)

(58) Field of Classification Search
CPC .... H04L 5/0007; H04L 5/0055; H04B 7/0452
See application file for complete search history.

(56) References Cited

U.S. PATENT DOCUMENTS

2010/0260159 A1* 10/2010 Zhang ............. H04W 28/06
                                                 370/338
2010/0310003 A1   12/2010 Lauer et al. .......... 375/267
(Continued)

FOREIGN PATENT DOCUMENTS

EP       2498531 A1    9/2012
WO    WO2011123422 A2  10/2011

OTHER PUBLICATIONS

International Search Report and Written Opinion of International Search Authority for PCT/CN2015/083604 dated Sep. 25, 2015 (10 pages).
(Continued)

*Primary Examiner* — Clemence Han
(74) *Attorney, Agent, or Firm* — Imperium Patent Works; Zheng Jin; Helen Mao

(57) ABSTRACT

Methods and apparatus are provided for burst OFDMA support MU-MIMO in the WLAN network. In one novel aspect, pluralities of user channels are configured for a downlink wideband channel, wherein each user channel is associated with a user group selecting from a SU-SISO, or a SU-MIMO or a MU-MIMO. In one embodiment, the SIG1 and SIG2 signaling fields are independent for each user channel. In another embodiment, the SIG1 fields are duplicates for all user channels carrying common information. The SIG2 fields for each user group are different from each other carrying user group specific information. In another novel aspect, an uplink OFDMA frames contains ACK packets from multiple STAs concurrently using an uplink wideband channel. In one embodiment, one ACK packet is sent for a MU-MIMO user group. In another embodiment, the uplink ACK packet assignment is based on indications in the downlink PHY SIG field.

26 Claims, 18 Drawing Sheets

Related U.S. Application Data

(60) Provisional application No. 62/021,776, filed on Jul. 8, 2014, provisional application No. 62/040,577, filed on Aug. 22, 2014.

(56) References Cited

U.S. PATENT DOCUMENTS

| | | | |
|---|---|---|---|
| 2011/0235593 A1 | 9/2011 | Gong et al. | 370/329 |
| 2011/0243073 A1 | 10/2011 | Gong et al. | 370/329 |
| 2012/0236817 A1 | 9/2012 | Chen et al. | 370/329 |
| 2012/0236971 A1* | 9/2012 | Taghavi Nasrabadi | H04L 5/0023 375/340 |
| 2012/0327870 A1 | 12/2012 | Grandhi et al. | 370/329 |
| 2012/0327882 A1 | 12/2012 | Park et al. | 370/329 |
| 2014/0369276 A1* | 12/2014 | Porat | H04L 5/003 370/329 |
| 2015/0023449 A1* | 1/2015 | Porat | H04L 5/0048 375/295 |
| 2015/0124745 A1 | 5/2015 | Tandra et al. | 370/329 |
| 2015/0139091 A1 | 5/2015 | Azizi et al. | 370/329 |
| 2015/0207599 A1* | 7/2015 | Kim | H04B 7/2621 370/329 |
| 2016/0316476 A1 | 10/2016 | Sampath et al. | 370/329 |

OTHER PUBLICATIONS

USPTO, Office Action for relate U.S. Appl. No. 14/794,680 dated Jun. 9, 2017 (19 pages).

\* cited by examiner

BURST OFDMA SUPPORTING MU-MIMO

CROSS REFERENCE TO RELATED APPLICATIONS

This application is a continuation-in-part of, and claims priority under 35 U.S.C. §120 from nonprovisional U.S. patent application Ser. No. 14/794,680, entitled "METHODS FOR PROVIDING CONCURRENT COMMUNICATIONS AMONG MULTIPLE WIRELESS COMMUNICATIONS DEVICES," filed on Jul. 8, 2015, the subject matter of which is incorporated herein by reference. Application Ser. No. 14/794,680, in turn, claims priority under 35 U.S.C. §119 from U.S. Provisional Application No. 62/021,776, entitled "MU-ACK FOR DOWNLINK MU-MIMO," filed on Jul. 8, 2014, the subject matter of which is incorporated herein by reference. This application also claims priority under 35 U.S.C. §119 from U.S. Provisional Application No. 62/040,577, entitled, "BURST OFDMA SUPPORTING MU-MIMO" filed on Aug. 22, 2014; the subject matter of which is incorporated herein by reference.

TECHNICAL FIELD

The disclosed embodiments relate generally to wireless communication, and, more particularly, to burst OFDAM supporting MU-MIMO.

BACKGROUND

Wireless local area WLAN networks (WLAN) have seen exponential growth across organizations in many industries. High-density wireless networks are increasingly in demand. Many new technologies have been adopted, such as multi-user multiple input multiple output (MU-MIMO) technology. As compared to single-user MIMO (SU-MIMO), MU-MIMO has several key advantages. First, MU-MIMO allows for a direct gain in multiple access system capacity proportional to the number of access point antennas. Second, MU-MIMO allows the higher degree spatial multiplexing gain to be obtained without the need for a higher number of antennas at the mobile stations by keeping the intelligence and cost at the access point. Third, MU-MIMO appears immune to most propagation limitations plaguing SU-MIMO communications because multiuser diversity can be extracted even in a simple line of sight (LOS) propagation environment. As a result, the LOS propagation, which causes degradation in single user spatial multiplexing schemes, is no longer a problem in the multiuser setting. The amount of data transmitted over the Internet has been growing exponentially. Further, with the rapid development of the technology, wireless connections will not only connect people via voice and data communications but also will connect smart devices, also called Internet of Things (IoT). The number of devices connected through wireless communication demands higher efficiency of the wireless network. Consequently, MU-MIMO becomes more widely adopted.

Currently, for wideband WLANWLAN downlink and uplink channels, a single user occupies the whole wideband. The signaling field for a user occupies a portion of the wideband. Therefore, with a single user occupying the wideband channel, the signaling fields of such wideband channels are duplicated resulting in degradation in bandwidth efficiency. With the growing demands for capacity of the WLANWLAN network, sharing the wideband with multiple users are desired.

Orthogonal frequency division multiple access (OFDMA) technology is developed in the cellular network enabling multiple users sharing the same wideband at the same time. Such technology, however, is not developed for the WLAN-WLAN network. How to adapt the OFDMA technology to the WLANWLAN to enable multiple users sharing the same wideband remains a question.

To improve the efficiency of the WLANWLAN network allowing multiple users to share the same wideband WLAN-WLAN channel, improvement and enhancement are required for the WLANWLAN network.

SUMMARY

Methods and apparatus are provided for burst OFDMA support MU-MIMO in the WLANWLAN network. In one novel aspect, pluralities of user channels are configured for a downlink wideband channel, wherein each user channel is associated with a user group. In one embodiment, each downlink user channel is independent modulation selecting from a group comprising: a SU-SISO, or a SU-MIMO or a MU-MIMO. In one embodiment, a station (STA) identifier (ID) is included in the signaling field for SU-SISO and SU-MIMO user group, or a group ID is included in the signaling field for the MU-MIMO user group. In one embodiment, the each downlink user channel includes a SIG1 and a SIG2 signaling field. In one embodiment, the SIG1 and SIG2 fields are independent for each user channel. In another embodiment, the SIG1 fields are duplicates for all user channels carrying common information for all user group. The SIG2 fields for each user group are different from each other carrying user group specific information. In yet another embodiment, at least one multi-band user channel is configured, wherein the multi-band user channel has more than one downlink narrow bands, and wherein the SIG1 and SIG2 of each narrow band in the multi-band user channel are duplicates. In one embodiment, the long training field (LTF) of each user channel is aligned in length. In another embodiment, at least one user channel is further divided into multiple sub-bands. Each sub-band forms a sub-band user channel associated with a user group.

In another novel aspect, the wireless communication station receives uplink OFDMA frames containing AK packets from multiple STAs concurrently using an uplink wideband channel comprising a first number of uplink narrow bands. In one embodiment, one ACK packet is sent for a MU-MIMO user group using the MU-MIMO group ID. In another embodiment, multiple ACK packets are sent for each of the STA in the MU-MIMO user group. In one embodiment, the uplink ACK packet has the same sub-band assignment as its corresponding downlink data frames. In another embodiment, the uplink ACK packet assignment is based on indications in the downlink PHY SIG field.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
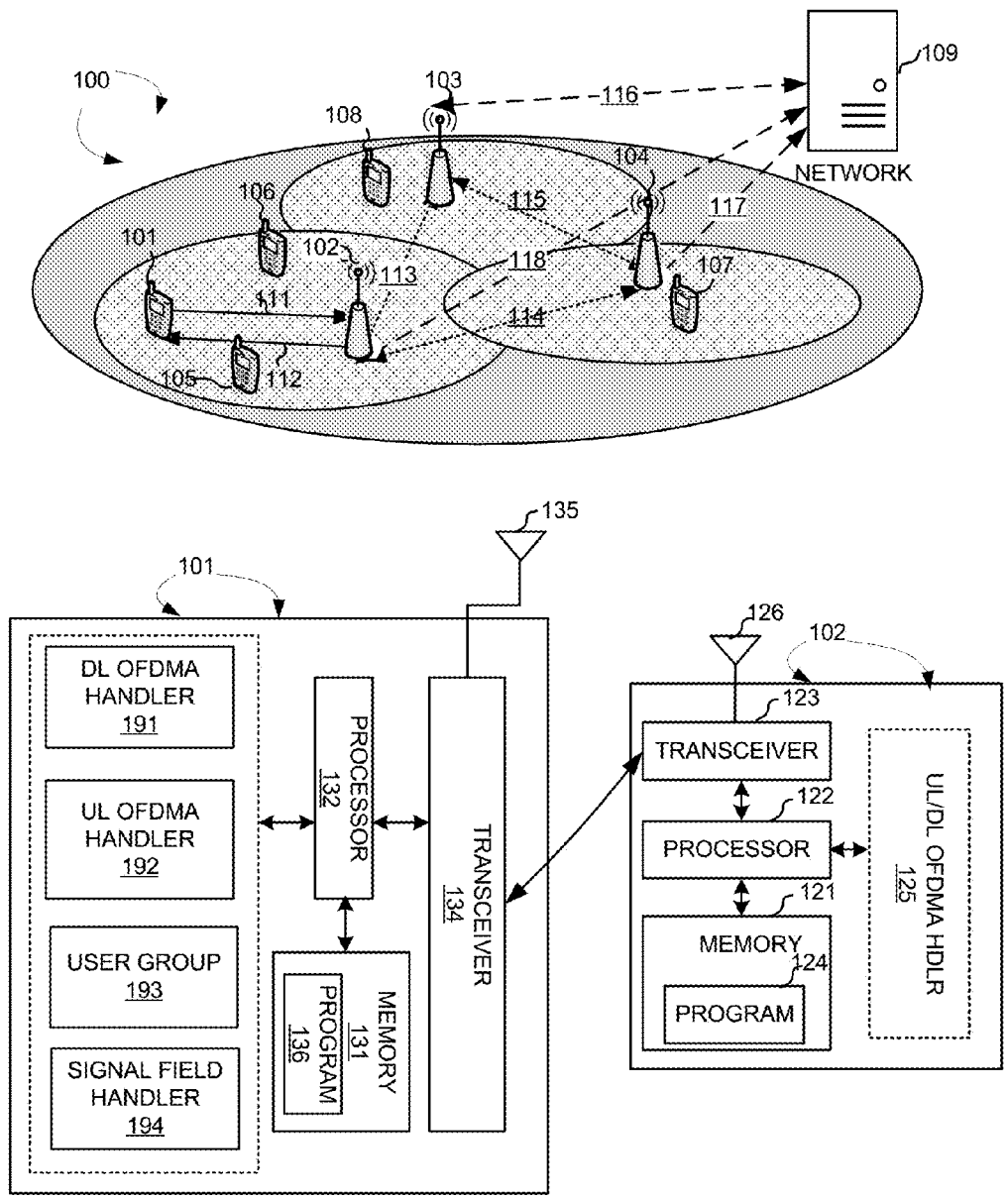
FIG. 1 illustrates an exemplary wireless network using the burst OFDMA for MU-MIMO in accordance with embodiments of the current invention.

FIG. 1 illustrates an exemplary wireless network 100 using burst OFDMA for MU-MIMO in accordance with embodiments of the current invention. Wireless communication system 100 includes one or more wireless networks, each of the wireless communication network has a fixed base infrastructure unit, such as wireless communications stations 102 103, and 104, forming wireless networks distributed over a geographical region. The base unit may also be referred to as an access point, an access terminal, a wireless communication station, a Node-B, an eNode-B, or by other terminology used in the art. Each of the receiving wireless communications stations 102, 103, and 104 serves a geographic area. Backhaul connections 113, 114 and 115 connect the non-co-located wireless communications stations, such as 102, 103, and 104. These backhaul connections can be either ideal or non-ideal A wireless communications device (STA) 101 in wireless network 100 is served by wireless communication station 102 via uplink 111 and downlink 112. Other wireless communications devices (STAs) 105, 106, 107, and 108 are served by different wireless communication stations. STAs 105 and 106 are served by wireless communication station 102. STA 107 is served by wireless communication station 104. STA 108 is served by wireless communication station 103.

In one embodiment, wireless communication network 100 is an OFDMA/MIMO system comprising wireless communication stations/access points (APs) 102, 103 and 104, and a plurality of mobile stations, such as wireless stations 101, 105, 106, 107 and 108. In the applications, each wireless communication station serves multiple wireless communications devices that periodically transmit packets. In some scenarios, a huge number of wireless stations contenting for the wireless channel results in collisions, long transmission range lead to high interface spaces and short packets increase overhead caused by headers. In one novel aspect, downlink transmissions to multiple wireless stations using MIMO and/or OFDMA are aggregated. When there is a downlink packet to be sent from a wireless communication station to a mobile station, data frames from different mobile stations meeting certain criteria are aggregated using OFDMA and transmitted together. In another novel aspect, multi-user OFDMA is used for uplink transmission. A network entity, such as a wireless controller 109 is connected with wireless communication stations such as wireless communication stations 102, 103, and 104, via links of 116, 117, and 118.

FIG. 1 further shows simplified block diagrams of wireless stations 101 and wireless communication station 102 in accordance with the current invention.

Wireless communication station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in wireless communication station 102. Memory 121 stores program instructions and data 124 to control the operations of wireless communication station 102. Wireless communication station 102 also includes a set of control modules, such as uplink (UL)/downlink (DL) OFDMA handler 125 that handles tasks related to OFDMA handling in wireless communication station 102.

Wireless communications device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Wireless communications device 101 also includes a set of control modules that carry out functional tasks. A DL OFDMA handler 191 receives OFDMA data frames from a wireless communications station using a downlink wideband channel comprising a first number of narrow bands in a WLAN network. A UL OFDMA 192 generates an acknowledgment (ACK) packet for the received downlink data frames and selects an uplink user channel for the ACK packet, wherein the uplink user channel comprises one or more narrow bands of an uplink wideband channel. A user group handler 193 detects a downlink user channel associating with the STA by decoding a station (STA) identifier (ID) if the STA belongs to a single user (SU) user group, otherwise, decoding a group ID, wherein the downlink user channel is configured with one or more narrow bands. A signal field handler 194 decodes downlink signaling fields and corresponding downlink data fields of detected downlink user channel, wherein the downlink signaling fields include at least a SIG1 and a SIG2.

Downlink Burst OFDMA MU-MIMO

Figure 2:
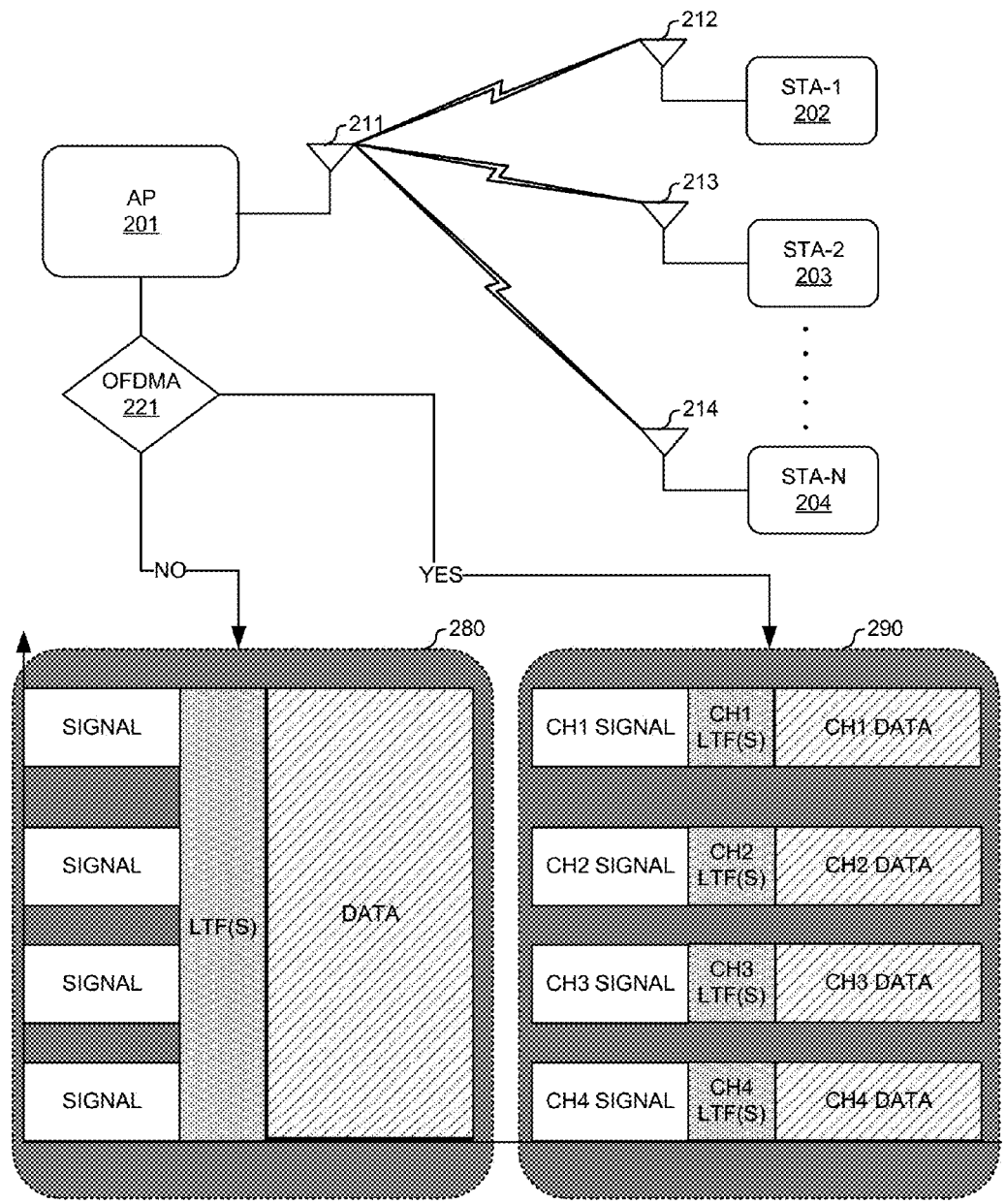
FIG. 2 illustrates an exemplary diagram in a wireless system configured with burst OFDMA for MU-MIMO in accordance with embodiments of the current invention.

FIG. 2 illustrates an exemplary diagram in a wireless system configured with burst OFDMA for MU-MIMO in accordance with embodiments of the current invention. An AP 201, with antenna 211 is configured to support downlink MU-MIMO OFDMA and uplink OFDMA. Exemplary multiple mobile stations STA-1 202, STA-2 203 and STA-N 204 connect to AP 201 via antennas 212, 213 and 214, respectively. In one embodiment, antennas 211 to 214, each is an antenna array in supporting of MIMO.

In one novel aspect, AP 201 transmits downlink information with wideband comprising of a plurality of narrow band channels. AP 201 transmits information to a plurality of wireless communications devices using OFMDA. In one embodiment, AP 201 receives uplink responding frames from the plurality of wireless communications stations concurrently using OFDMA. In one embodiment, AP 201 exchanges configuration information with the plurality of wireless communications devices, such as STA-1 202, STA-2 203, and STA-N 204. Based on the configuration information, the STAs form SU user groups, or MU user groups. The SU user group can be a single input single output (SISO) or a SU-MIMO group. The MU user group can be a MU-MIMO group.

FIG. 2 further illustrates the base station initiates OFDMA operation in accordance to embodiments of the current invention. Multiple STAs STA-1 202, STA-2 203, and STA-N 204 are connected with AP 201. In one embodiment, the DTAs receive downlink transmission from wireless stations, such as AP 201, using OFDMA scheme. In one novel aspect, an indication is included to indicate the configuration for burst OFDMA. In one embodiment, an indication bit is included in the physical layer signal field (PHY SIG). Different symbol number of SIG fields can be defined and is indicated by one or more bits in the first SIG field. For example, for a wideband channel of 80 MHz, the wideband channel is divided into four narrow bands, each with 20 MHz. For each 20 MHz of the wideband channel, if the MU-MIMO bit in PHY SIG-A is not set, the STA ID will specify the receiving STA. If the MU-MIMO bit is set in the PHY SIG-A field for the 20 MHz narrow band, a MU user group ID will specify the receiving MU-MIMO user group. In another example, if contiguous two 20 MHz is assigned to one STA, the 40 MHz definition is used with the bandwidth set to be 40 MHz.

As illustrated in FIG. 2, AP 201 at step 221 determines if the downlink OFDMA is supported. If step 221 determines no, the downlink wideband channel 280 is assigned to one user occupying the entire data bandwidth. The signal channels are duplicates across the narrow bands. If step 221 determines yes, the downlink wideband channel 290 is configured to multiple narrow bands. One or more narrow bands of downlink wideband channel 290 can be assigned to a SU-SISO, a SU-MIMO, or a MU-MIMO.

In one novel aspect, the downlink wideband channel is configured with a plurality of narrow band. For each configured sub band, the modulation is independent. The modulation can be SU or MU. In the SU case, the user channel for the user group can be SU-SISO or SU-MIMO with spatial division modulation (SDM). In the MU case, the user channel for the user group can be MU-MIMO with SDM. Other configurations are possible for the configured sub band.

Figure 3:
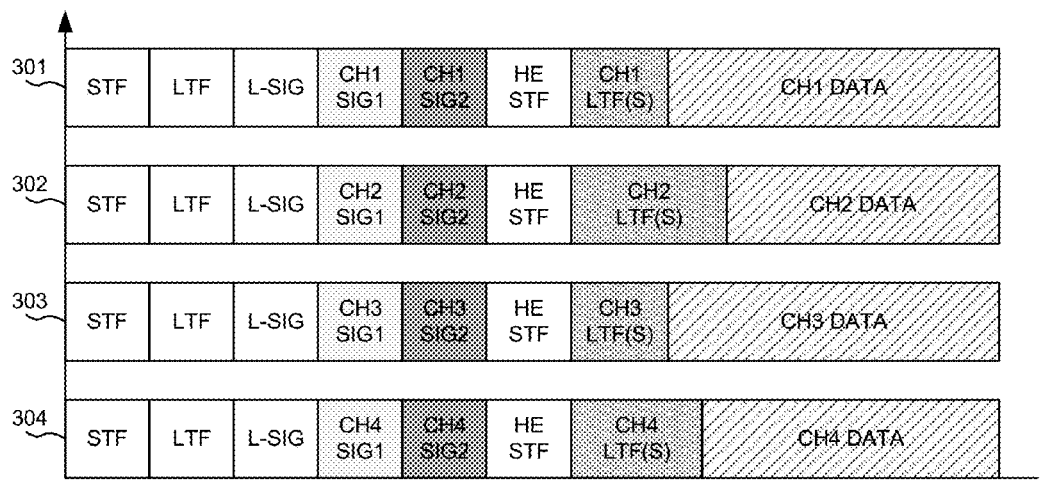
FIG. 3 illustrates an exemplary downlink OFMDA scheme for the WLANWLAN network with an independent signal field for each user channel in accordance with embodiments of the current invention.

FIG. 3 illustrates an exemplary downlink OFMDA scheme for the WLAN network with the independent signal field for each user channel in accordance with embodiments of the current invention. A downlink wideband channel is configured with four narrow bands, 301, 302, 303 and 304. Each configured narrow band is associated with a user group. In one embodiment, each narrow band is a user channel associated with a user group. Signal fields SIG1 and SIG2 for each user channel are independent and contain user group specific information. The long training field (LTE) has a different length for different user channels. The LTE for each user channel is followed by data frames for the user channel. The data frames for each user group is transmitted by the wireless communication station concurrently to each STA.

Figure 4:
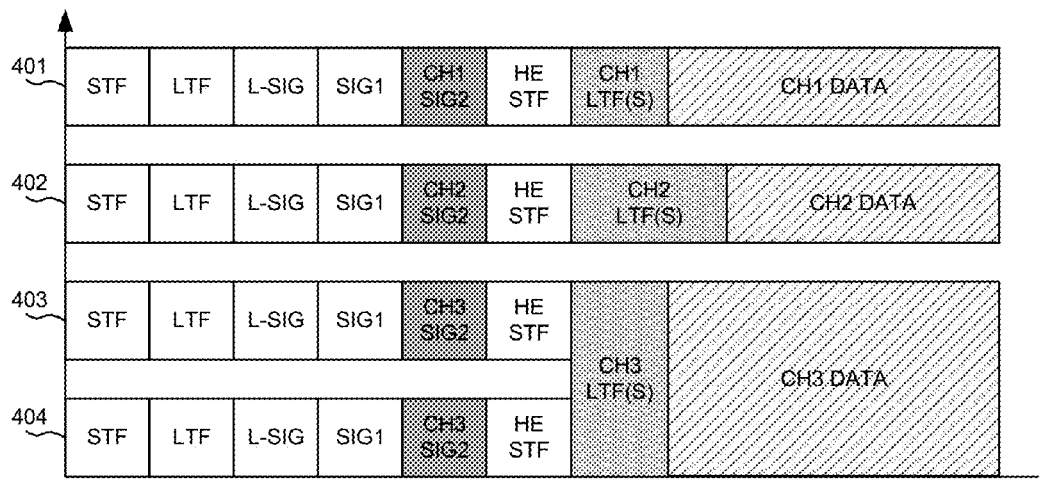
FIG. 4 illustrates an exemplary downlink OFDMA scheme for the WLAN network with multiple narrow bands configured for one user channel in accordance with embodiments of the current invention.

FIG. 4 illustrates an exemplary downlink OFDMA scheme for the WLAN network with multiple narrow bands configured for one user channel in accordance with embodiments of the current invention. A downlink wideband channel is configured with four narrow bands, 401, 402, 403 and 404. In one embodiment, more than one narrow bands are used to form a user channel to be associated with a predefined user group. As shown in FIG. 4, narrow bands 401 and 402 each forms a user channel using narrow bands 401 and 402, respectively. A new user channel is formed using contiguous narrow bands 403 and 404 to form a user channel. In one embodiment, as shown in FIG. 4, SIG1 are common and duplicates for all configured narrow band. In particular, SIG1 in narrow bands 401 to 404 are duplicate with each other. The SIG2 is independent from each other for each user channels. SIG2 for narrow bands 401 and 402 are different, each contains user group specific information. SIG2 in narrow bands 403 and 404 are duplicates, both being CH3 SIG2, containing the same information the user group associates with the user channel. In another embodiment, not shown in the figure, SIG1 can also be independent for each user channel. In this embodiment, SIG1 for narrow bands 401 and 402 are different. SIG1 for narrow bands 403 and 404 are duplicates.

Figure 5:
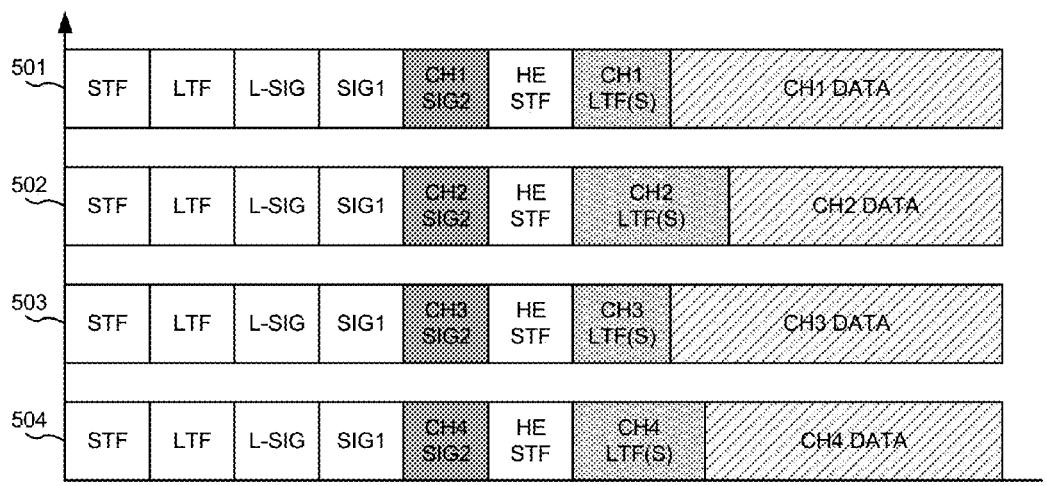
FIG. 5 illustrates an exemplary downlink OFMDA scheme for the WLAN network with SIG1 carrying common information and SIG2 independently carrying user group specific information in accordance with embodiments of the current invention.

FIG. 5 illustrates an exemplary downlink OFMDA scheme for the WLAN network with SIG1 carrying common information and SIG2 independently carrying user group specific information in accordance with embodiments of the current invention. A downlink wideband channel is configured with four narrow bands, 501, 502, 503 and 504. In one embodiment, each narrow band is a user channel associated with a user group. Signal fields SIG1 contains common information for all user group and are duplicates for narrow bands 501 to 504. SIG2 for each user channel is independent and contains user group specific information. The long training field (LTE) has a different length for different user channels.

Figure 6:
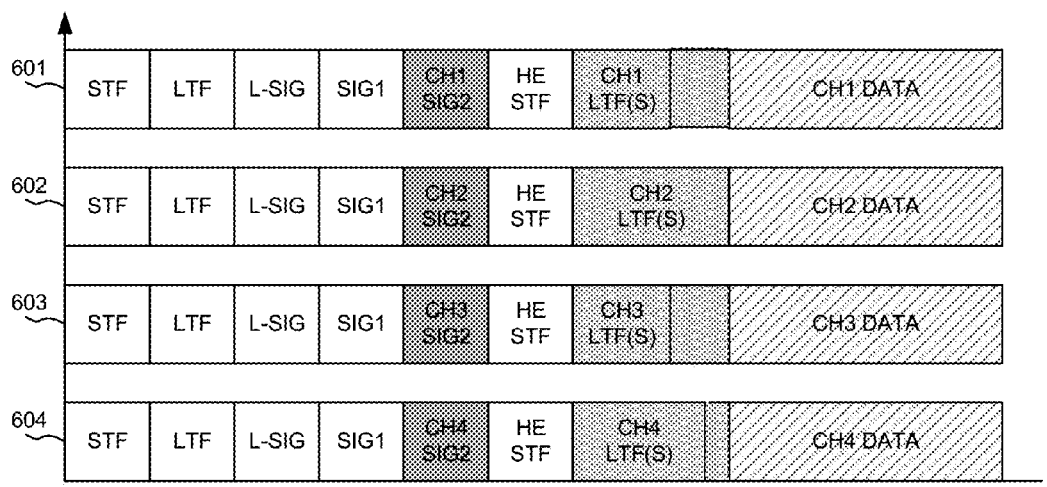
FIG. 6 illustrates an exemplary downlink OFDMA scheme for the WLAN network where the LTF fields for each user channel are aligned in length in accordance with embodiments of the current invention.

FIG. 6 illustrates an exemplary downlink OFDMA scheme for the WLAN network where the LTF fields for each user channel are aligned in length in accordance with embodiments of the current invention. A downlink wideband channel is configured with four narrow bands, 601, 602, 603 and 604. In one embodiment, each narrow band is a user channel associated with a user group. As shown in FIG. 6, the SIG1 fields are common for each user channel while the SIG2 fields are different for each user channel. In one embodiment, the LTF for each user channel is aligned in length with paddings. As shown, CH1 LTF, CH2 LTF, CH3 LTF and CH4 LTF are of different length originally. Paddings are added at the end of the CH1 LTF, CH3 LTF, and CH4 LTF such that the LTF fields for each user channel have the same length.

Figure 7:
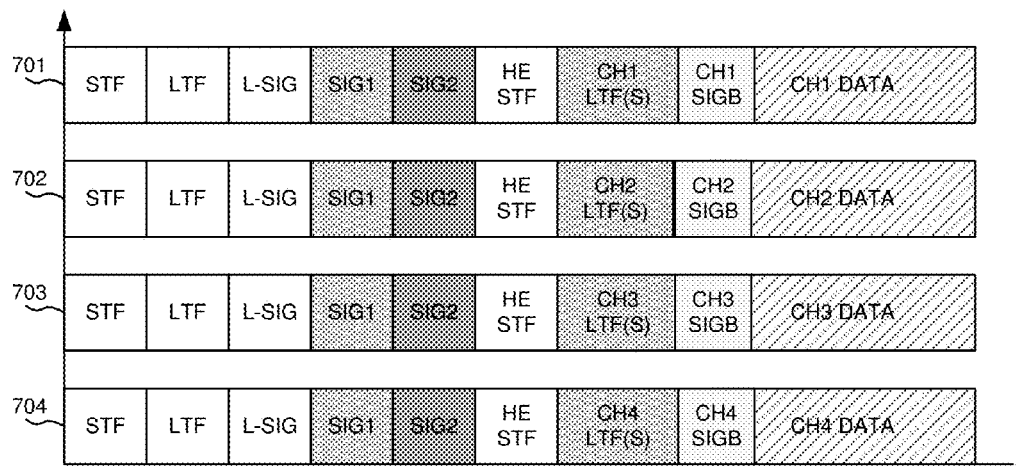
FIG. 7 illustrates an exemplary downlink OFDMA scheme for the WLAN network where the SIG1 and SIG2 are common and duplicated for all user channels with SIGB being independent with user group specific information in accordance with embodiments of the current invention.

FIG. 7 illustrates an exemplary downlink OFDMA scheme for the WLAN network where the SIG1 and SIG2 are common and duplicated for all user channels with SIGB being independent with user group specific information in accordance with embodiments of the current invention. A downlink wideband channel is configured with four narrow bands, 701, 702, 703 and 704. In one embodiment, each narrow band is a user channel associated with a user group. The SIG1 and SIG2 fields in all user channels contain common information. The SIG1 and SIG2 fields are duplicated for all user channels. The LTF fields for all user channels are aligned in length. The LTF field for each user channel is followed by a SIGB field, which are independent and contains user group specific information. The SIGB field may occupy one or more OFDM symbols.

Figure 8:
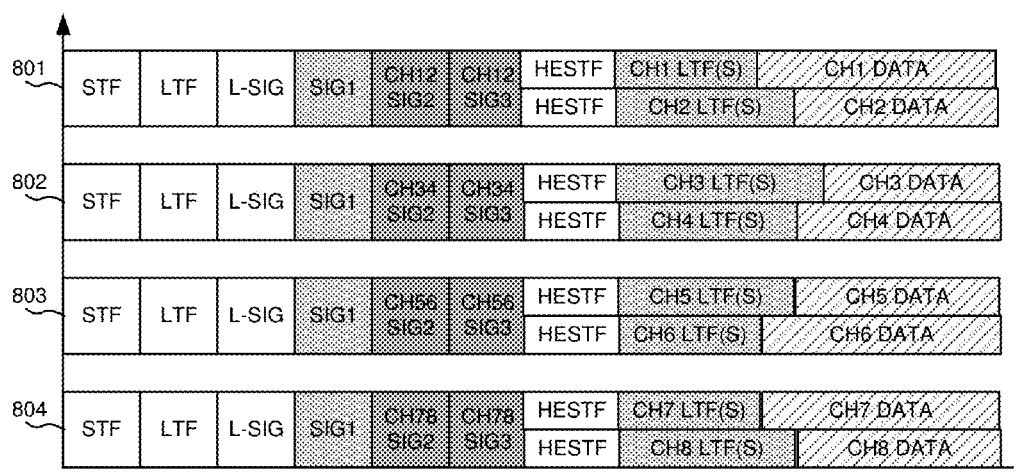
FIG. 8 illustrates an exemplary downlink OFDMA scheme for the WLAN network where sub-band are configured for the user channel, the SIG1 only has common information, and SIG2 and SIG3 are different in accordance for different user channels with embodiments of the current invention.

FIG. 8 illustrates an exemplary downlink OFDMA scheme for the WLAN network where sub-band are configured for the user channel, the SIG1 only has common information, and SIG2 and SIG3 are different in accordance for different user channels with embodiments of the current invention. A downlink wideband channel is configured with four narrow bands, 801, 802, 803 and 804. In one embodiment, configured narrow band is further divided into multiple sub-bands; each associates with a user group. As shown in FIG. 8, narrow bands 801, 802, 803 and 804 are divided into two sub-bands. In one embodiment, the downlink wideband has a bandwidth of 80 MHz. Each configured narrow band, 801, 802, 803 and 804, is 20 MHz. The 20 MHz narrow band is further divided into 10 MHz narrow band. Each of the 10 MHz narrow band is associated with a user group. In one embodiment, as shown in FIG. 8, all configured narrow bands 801, 802, 803, and 804 have duplicated SIG1 field containing common information for all configured user group. SIG2 and SIG3 fields for narrow bands 801, 802, 803 and 804 are independent and different from each other. In one embodiment, SIG2 and SIG3 fields in 801, CH12 SIG2 and CH12 SIG3, contain user group specific information for channels CH1 and CH2. Similarly, SIG2 and SIG3 fields in 802, CH34 SIG2 and CH34 SIG3, contain user group specific information for channels CH3 and CH4. SIG2 and SIG3 fields in 803, CH56 SIG2 and CH56 SIG3, contain user group specific information for channels CH5 and CH6. SIG2 and SIG3 fields in 804, CH78 SIG2 and CH78 SIG3, contain user group specific information for channels CH7 and CH8.

Figure 9:
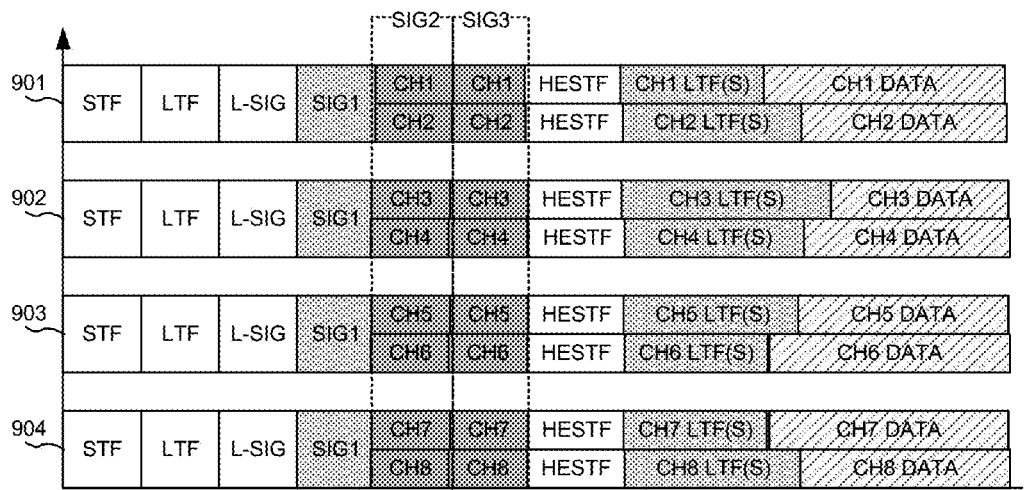
FIG. 9 illustrates an exemplary downlink OFDMA scheme for the WLAN network where sub-band are configured for the user channel, the SIG1 only has common information, and SIG2 and SIG3 are different for different sub-band user channels in accordance with embodiments of the current invention.

FIG. 9 illustrates an exemplary downlink OFDMA scheme for the WLAN network where sub-band are configured for the user channel, the SIG1 only has common information, and SIG2 and SIG3 are different for different sub-band user channels in accordance with embodiments of the current invention. A downlink wideband channel is configured with four narrow bands, 901, 902, 903 and 904. In one embodiment, configured narrow band is further divided into multiple sub-bands; each associates with a user group. As shown in FIG. 9, narrow bands 901, 902, 903 and 904 are divided into two sub-bands. All configured narrow bands 901, 902, 903, and 904 have duplicated SIG1 field containing common information for all configured user group. SIG2 and SIG3 fields in each configured narrow band are also divided into two sub-band; each contains corresponding user group specific information. As shown in FIG. 9, SIG2 fields are divided the same way as the data fields into CH1 SIG2 to CH8 SIG2. Similarly, SIG3 fields are divided the same way as the data fields into CH1 SIG3 to CH8 SIG3.

Figure 10:
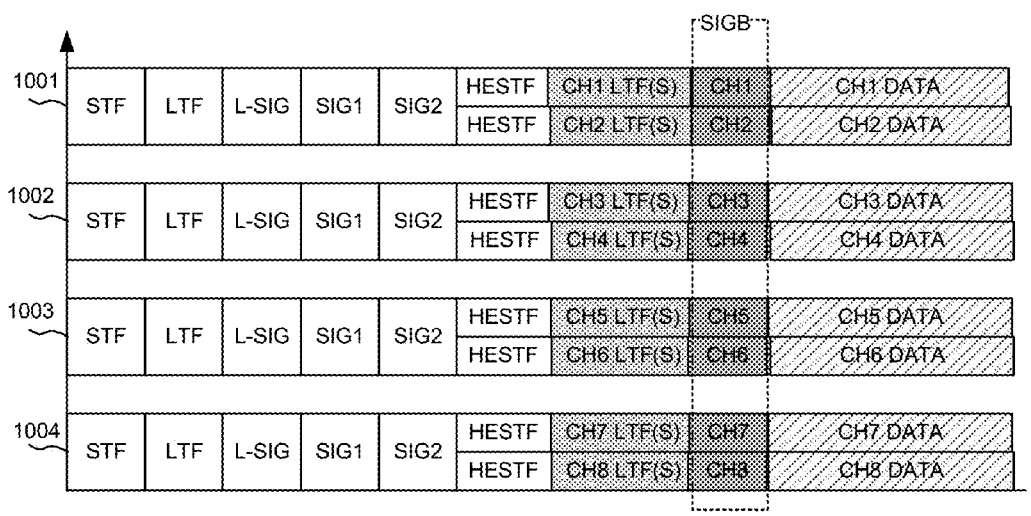
FIG. 10 illustrates an exemplary downlink OFDMA scheme for the WLAN network where sub-band are configured for the user channel, the SIG1 only has common information, and SIG2 and SIG3 are different for different sub-band user channels in accordance with embodiments of the current invention.

FIG. 10 illustrates an exemplary downlink OFDMA scheme for the WLAN network where sub-band are configured for the user channel, the SIG1 only has common information, and SIG2 and SIG3 are different for different sub-band user channels in accordance with embodiments of the current invention. A downlink wideband channel is configured with four narrow bands, 1001, 1002, 1003 and 1004. In one embodiment, configured narrow band is further divided into multiple sub-bands; each associates with a user group. As shown in FIG. 10, narrow bands 1001, 1002, 1003, and 1004 are divided in two sub-bands. All configured narrow bands 1001, 1002, 1003, and 1004 have duplicated SIG1 and SIG2 fields containing common information for all configured user group. The LTF fields for all user channels are aligned in length followed by the SIGB fields for each user channel. The SIGB fields are independent and contain user group specific information for each corresponding user group.

UPLINK Burst OFDMA MU-MIMO

In another novel aspect, the uplink OFDMA acknowledgment (ACK) is used if an OFDMA bit is set in the signal field. The wideband uplink channel is configured with multiple narrow bands. Multiple uplink user channels are configured, wherein each uplink user channel is associated with a uplink user group. In one embodiment, uplink user channels and uplink user groups share the same configuration as the downlink user channels by default. The default configuration can be override based on detected conditions comprising: a higher layer configuration, a message from a network entity, a user configuration, and an internal operation by the wireless communication station.

In one embodiment, indications in the signal field are used to allocate the ACK packet for each STA. In one example, a 2-bit ACK_order, a 4-bit sub_band_assignment bitmap, and a target AP received power density value are included in the PHY SIG fields sent to each STA. The ACK_order indicator specifies which ACK packet the STA should reply. If only one ACK packet is required, the ACK_order field is set to be zero. The sub_band_assignment bitmap specifies the one or more sub-bands the ACK packet occupies. For example, in a four narrow bands configuration, the sub_band_assignment bitmap 0100 means the second sub-band is assigned to the ACK packet; while 0011 means the third and the fourth sub-bands are assigned for the ACK packet. Multiple ACK packets may be required if MU-MIMO is used in the sub band. In one embodiment, AP polling for the second and following ACKs is optional and is indicated by the ACK_polling bit in the PHY SIG field.

In another embodiment, the sub-band assignment for the uplink ACK packet is the same as the received downlink OFDMA packet. The target AP received power density in the PHY SIG field is specified to each STA. For sub-bands using MU-MIMO, all STAs in the MU-MIMO reply using uplink MU-MIMO with the same group ID where only one ACK packet is required for the MU-MIMO group. In yet another embodiment, the sub-band assignment for the first ACK packet is the same as the received downlink OFDMA packet. For sub-bands using MU-MIMO, only the first user in the user group replies in the first uplink OFDMA packet. The ACK_order and sub_band_assignment in the PHY SIG fields are used to specify the sub-band assignment for other users in the MU-MIMO group. Multiple ACK packets for the MU-MIMO group are required. The following figures illustrate exemplary details for the uplink ACK packets using OFDMA.

Figure 11:
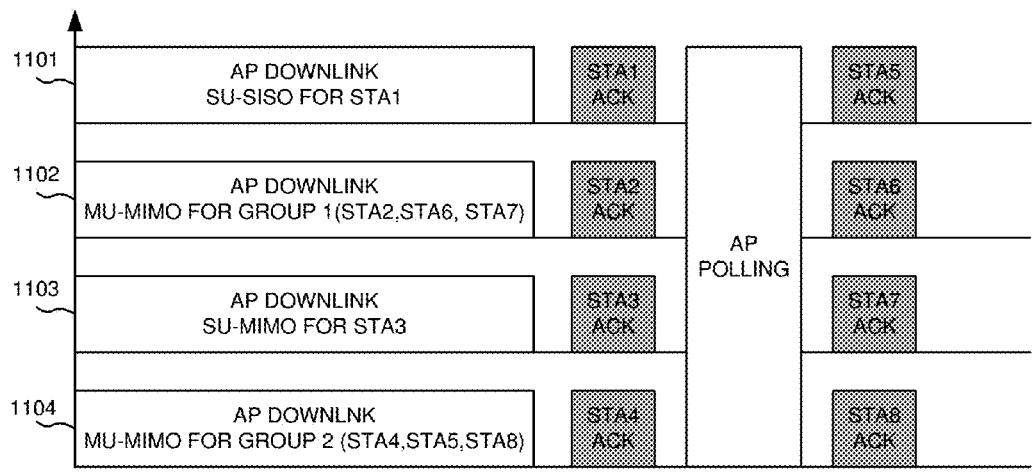
FIG. 11 illustrates an exemplary uplink OFDMA ACK scheme where each STA has a corresponding ACK packet in accordance with embodiments of the current invention.

FIG. 11 illustrates an exemplary uplink OFDMA ACK scheme where each STA has a corresponding ACK packet in accordance with embodiments of the current invention. Four user channels are configured for downlink and uplink wideband channels. For a downlink wideband channel, user channels 1101, 1102, 1103, and 1104 are configured. Downlink user channel 1101 carries SU-SISO for STA1. Downlink user channel 1102 carries MU-MIMO for group #1 including STA2, STA6, and STA7. Downlink user channel 1103 carries SU-MIMO for STA3. Downlink user channel 1104 carries MU-MIMO for group #2 including STA4, STA5, and STA8. In one embodiment, each STA sends the ACK packet based on the indications in the downlink PHY SIG fields. For example, STA1 receives indications with ACK_order=0, and sub_band_assignment=1000 in the PHY SIG field. Accordingly, STA1 sends the ACK packet in the first uplink packet at sub-band one. Similarly, STA7 receives indications with ACK_order=1 and sub_band_assignment=0010 in the PHY SIG field. STA7, thereby, sends the ACK packet in the second uplink packet at sub-band three. Other stations follow the rule and send their ACK packet accordingly.

In another embodiment, the sub-band assignment for the uplink ACK packet is the same as the received downlink OFDMA packet. Therefore, STA1 sends its ACK packet at sub-band one since it receives its downlink packets at sub-band one. Similarly, STA3 sends its ACK at sub-band three. For STAs in the MU-MIMO group, the first STA configured on the MU-MIMO user group follows the same rule as the SU group. For example for MU-MIMO group #1, STA2 is the first configured for the group. STA2 sends its ACK packet on the first uplink packet at sub-band two. Similarly, STA4 is the first configured for MU-MIMO group#2. STA4 sends its ACK packet on the first uplink packet at sub-band four. Other STAs in the MU-MIMO user group selects its sub-band based on the indications in the signal fields. For example, STA6 sends it ACK packet on the second sub-band of the second uplink packet with ACK_order=1 and sub_band_assignment=0100.

Figure 12:
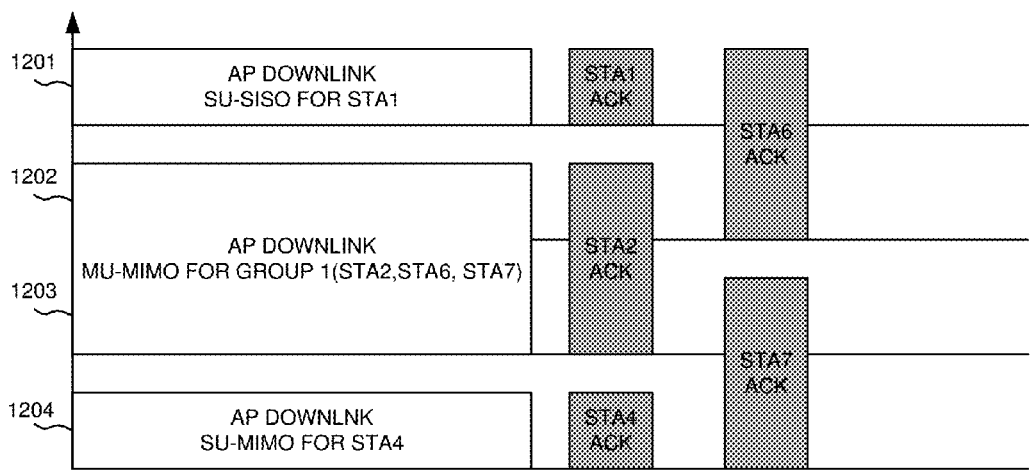
FIG. 12 illustrates an exemplary uplink OFDMA ACK scheme where each STA has a corresponding ACK packet and the ACK packet occupies more than one narrow bands of the uplink OFMDA wideband channel in accordance with embodiments of the current invention.

FIG. 12 illustrates an exemplary uplink OFDMA ACK scheme where each STA has a corresponding ACK packet and the ACK packet occupies more than one narrow bands of the uplink OFMDA wideband channel in accordance with embodiments of the current invention. Four narrow bands 1201, 1202, 1203, and 1204 are configured for a downlink wideband channel. A first user channel occupies narrow band 1201 associates with SU-SISO STA1. A second user channel occupies narrow band 1202 and 1203 associates with MU-MIMO user group #1, including STA2, STA6, and STA7. A third downlink user channel occupies narrow band 1204 associates with SU-MIMO STA4. In one embodiment, the ACK packet for downlink packets occupies the same bandwidth as the downlink packets. As shown, STA2 sends the ACK packet occupying two narrow bands configured for the uplink. Similarly, STA6 and STA7 send their corresponding ACK packets occupying two narrow bands configured for the uplink.

Figure 13:
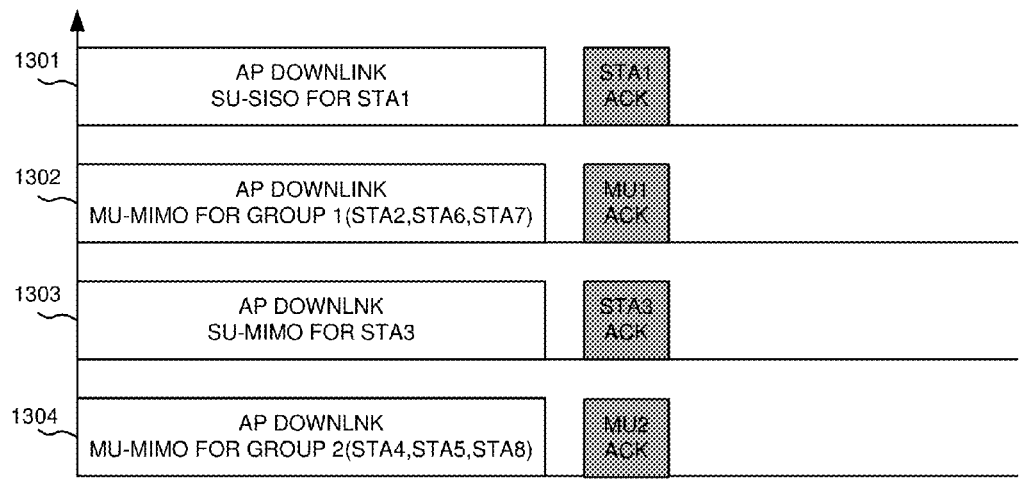
FIG. 13 illustrates an exemplary uplink OFDMA ACK scheme where all STAs in the same MU user group have the same ACK packet associated with the MU user group ID in accordance with embodiments of the current invention.

FIG. 13 illustrates an exemplary uplink OFDMA ACK scheme where all STAs in the same MU user group have the same ACK packet associated with the MU user group ID in accordance with embodiments of the current invention. In one embodiment, one ACK packet is sent for MU-MIMO user group using the MU-MIMO group ID. Four user channels are configured for downlink and uplink wideband channels. For a downlink wideband channel, user channels 1301, 1302, 1303, and 1304 are configured. Downlink user channel 1301 carries SU-SISO for STA1. Downlink user channel 1302 carries MU-MIMO for group #1 including STA2, STA6, and STA7. Downlink user channel 1303 carries SU-MIMO for STA3. Downlink user channel 1304 carries MU-MIMO for group #2 including STA4, STA5, and STA8. In one embodiment, the uplink sub-band assignment is the same as the downlink sub-band assignment. STA1 sends its ACK packet at sub-band one since it receives its downlink packets at sub-band one. Similarly, STA3 sends its ACK at sub-band three. In one embodiment, for MU-MIMO user group, only one ACK packet is sent for all the STAs in the user group. Therefore, MU1 ACK packet is sent at sub-band two for STA2, STA6 and STA7 with the MU-MIMO group#1 group ID. Similarly, MU2 ACK packet is sent at sub-band four for STA4, STA5 and STA8 with the MU-MIMO group#2 group ID.

Figure 14:
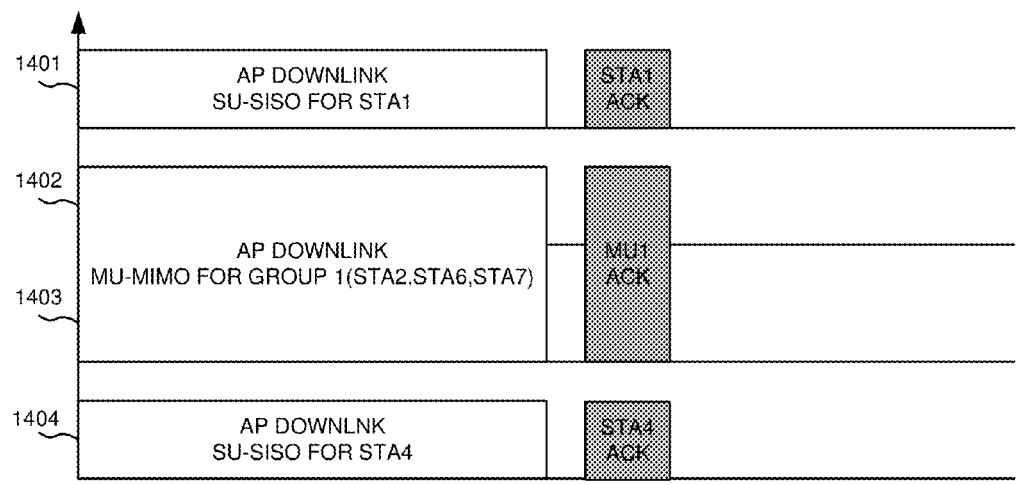
FIG. 14 illustrates an exemplary uplink OFDMA ACK scheme where all STAs in the same MU user group have the same ACK packet associated with the MU user group ID and the ACK packet occupies more than one narrow band in the uplink wideband channel in accordance with embodiments of the current invention.

FIG. 14 illustrates an exemplary uplink OFDMA ACK scheme where all STAs in the same MU user group have the same ACK packet associated with the MU user group ID and the ACK packet occupies more than one narrow bands in the uplink wideband channel in accordance with embodiments of the current invention. In one embodiment, the ACK packet for the MU-MIMO user group should have the same sub-band assignment as the received downlink data frames. Four narrow band 1401, 1402, 1403, and 1404 are configured for a downlink wideband channel. A first user channel occupies narrow band 1401 associates with SU-SISO STA1. A second user channel occupies narrow bands 1402 and 1403 associates with MU-MIMO user group #1, including STA2, STA6, and STA7. A third downlink user channel occupies narrow band 1404 associates with SU-MIMO STA4. One ACK packet is sent for the MU-MIMO group. The ACK packet for the MU-MIMO group has the same sub-band assignment as the downlink data frames. Therefore, the ACK packet for MU-MIMO group #1, MU1 ACK, occupies the second and the third sub-band of the uplink wideband channel. The MU1 ACK contains the MU-MIMO user group #1 group ID.

Figure 15:
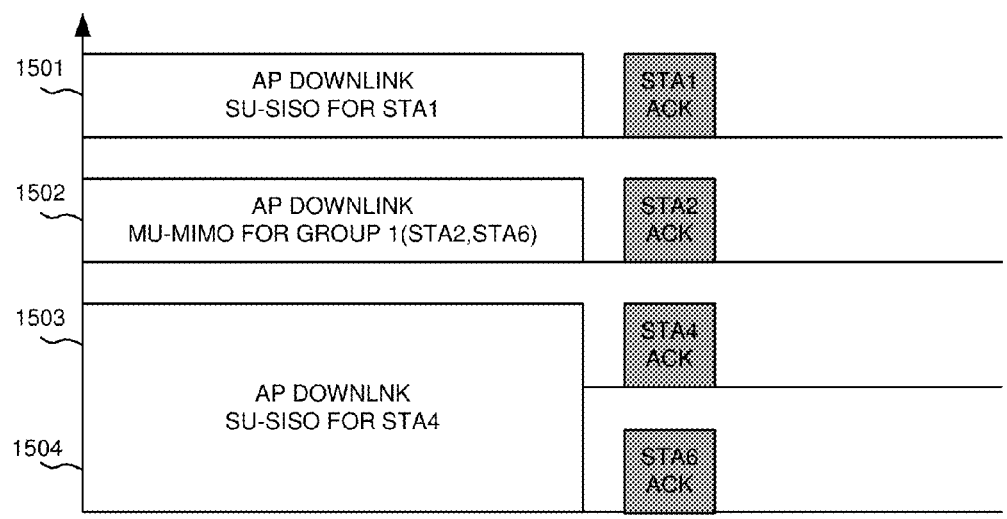
FIG. 15 illustrates an exemplary uplink OFDMA ACK scheme where a lower bandwidth is selected for the ACK packet in response to downlink packets with higher bandwidth in accordance with embodiments of the current invention.

FIG. 15 illustrates an exemplary uplink OFDMA ACK scheme where a lower bandwidth is selected for the ACK packet in response to downlink packets with higher bandwidth in accordance with embodiments of the current invention. In one embodiment, a lower bandwidth is chosen for the ACK packet in response to downlink packets with higher bandwidth. A downlink wideband channel is configured with four narrow bands, 1501, 1502, 1503, and 1504. A first user channel occupies narrow band 1501 associating with SU-SISO STA1. The second user channel occupies narrow band 1502 associating with MU-MIMO group #1 including STA2 and STA6. The third user channel occupies narrow bands 1503 and 1504 associating with SU-SISO STA4. In one embodiment, the ACK packet for STA 4 occupies one narrow band of the uplink wideband channel even though STA4 receives the data packets that occupy two narrow bands. As shown in FIG. 15, STA1 sends the ACK packet at sub-band one. STA2 of the MU-MIMO group #1 sends the ACK packet at sub-band two. STA4 sends the ACK packet at sub-band three. Instead of occupying both sub-band three and four, STA4 sends the ACK packet with a lower bandwidth than the received data frames. Therefore, STA6 of MU-MIMO group #1 sends the ACK packet at sub-band four.

Figure 16:
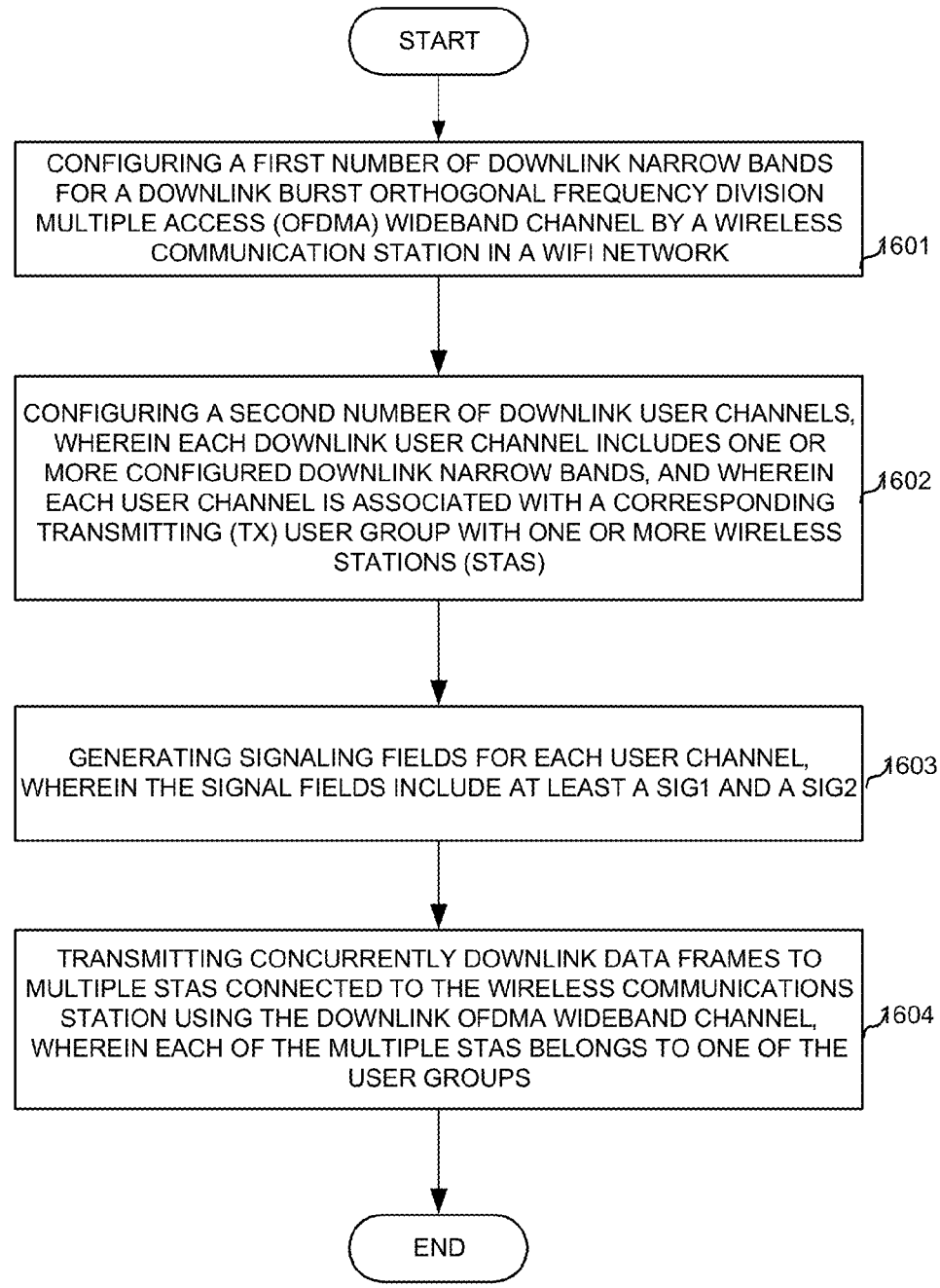
FIG. 16 shows an exemplary flow chart for a wireless communications station to send and receive OFDMA packets in a WLAN network in accordance with embodiments of the current invention.

FIG. 16 shows an exemplary flow chart for a wireless communication station to send and receive OFDMA packets in a WLAN network in accordance with embodiments of the current invention. At step 1601, the wireless communications station configures a first number of downlink narrow bands for a downlink burst orthogonal frequency division multiple access (OFDMA) wideband channel in a WLAN network. At step 1602, the wireless communication station configures a second number of downlink user channels, wherein each downlink user channel includes one or more configured downlink narrow bands, and wherein each user channel is associated with a corresponding user group with one or more wireless stations (STAs). At step 1603, the wireless communication station generates signaling fields for each user channel, wherein the signal fields include at least a SIG1 and a SIG2. At step 1604, the wireless communication station transmits concurrently downlink data frames to multiple STAs connected to the wireless communications station using the downlink OFDMA wideband channel, wherein each of the multiple STAs belongs to one of the user groups.

Figure 17:
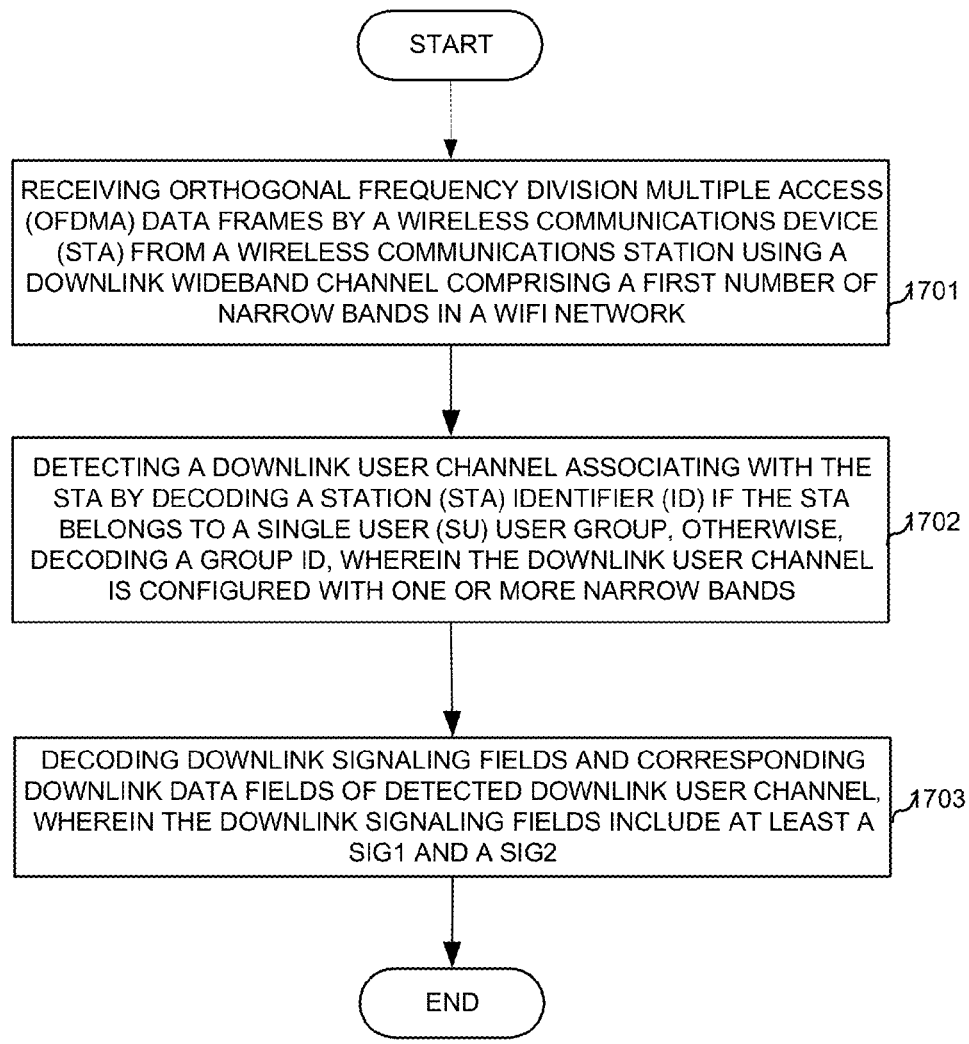
FIG. 17 shows an exemplary flow chart for a wireless communications device (STA) to send and receive OFDMA packets in a WLAN network in accordance with embodiments of the current invention.

FIG. 17 shows an exemplary flow chart for a STA to send and receive OFDMA packets in a WLAN network in accordance with embodiments of the current invention. At step 1701, the STA receives orthogonal frequency division multiple access (OFDMA) data frames from a wireless communications station using a downlink wideband channel comprising a first number of narrow bands in a WLAN network. At step 1702, the STA detects a downlink user channel associating with the STA by decoding a station (STA) identifier (ID) if the STA belongs to a single user (SU) user group, otherwise, decoding a group ID, wherein the downlink user channel is configured with one or more narrow bands. At step 1703, the STA decodes downlink signaling fields and corresponding downlink data fields of detected downlink user channel, wherein the downlink signaling fields include at least a SIG1 and a SIG2.

Providing Concurrent Communications Among Multiple Wireless Communications Devices Methods are provided for concurrent communications among multiple wireless communications devices. In one novel aspect, the wireless station communicates with a plurality of wireless communications devices by using multiple users multiple input and multiple output (MU-MIMO) and Orthogonal Frequency Demodulation Multiple Access (OFDMA) transmission. The wireless station transmits a wideband signal to a plurality of wireless communications devices using downlink MIMO and/or OFDMA. The wireless station receives a plurality of responding frames from the plurality of wireless communications devices concurrently each using a corresponding uplink narrow band. In one embodiment, the pluralities of frames are sent concurrently using OFDMA. In another embodiment, the wireless station transmits a MU indication bit and MU bandwidth assignment information in the downlink MIMO and/or OFDMA frames. In yet another embodiment, the MU indication bit is included in the PHY SIG field. The MU bandwidth assignment information is included in the PHY SIG field.

In another novel aspect, the uplink responding frames from multiple wireless communications devices are sent on a corresponding narrow concurrently over more than one transmission instance. In one embodiment, AP polling is used between two transmission instances. In another embodiment, only SIFS is used in between the two transmission instances. In one embodiment, when the concurrent responding frames occupies less than a bandwidth of an available uplink OFDMA bandwidth, the unoccupied bandwidth is either left empty or occupied by one or more duplicated responding frames of one wireless communications devices. In yet another embodiment, the mixed use of the sequential uplink responding frames and the concurrent uplink OFDMA responding frames are used.

Figure 18:
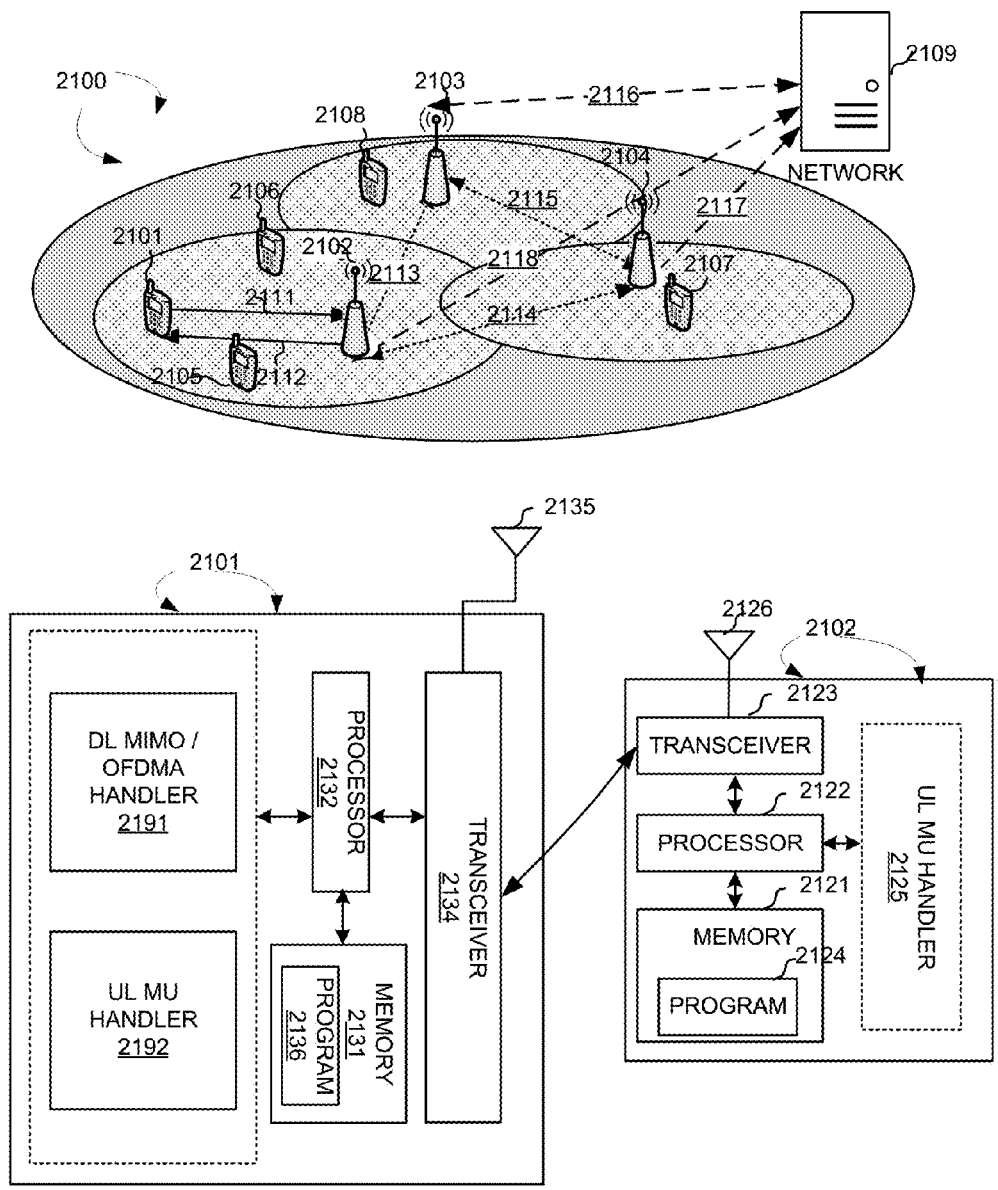
FIG. 18 illustrates an exemplary wireless network 100 with downlink MU-MIMO and/or OFDMA scheme and concurrent uplink feedback in accordance with embodiments of the current invention.

FIG. 18 illustrates an exemplary wireless network 2100 with downlink MU-MIMO and concurrent uplink feedback in accordance with embodiments of the current invention. Wireless communication system 2100 includes one or more wireless networks, each of the wireless communication network has a fixed base infrastructure unit, such as wireless communications stations 2102 2103, and 2104, forming wireless networks distributed over a geographical region. The base unit may also be referred to as an access point, an access terminal, a base station, a Node-B, an eNode-B, or by other terminology used in the art. Each of the receiving wireless communications stations 2102, 2103, and 2104 serves a geographic area. Backhaul connections 2113, 2114, and 2115 connect the non-co-located wireless communications stations, such as 2102, 2103, and 2104. These backhaul connections can be either ideal or non-ideal A wireless communications device 2101 in wireless network 2100 is served by base station 2102 via uplink 2111 and downlink 2112. Other wireless communications devices 2105, 2106, 2107, and 2108 are served by different base stations. Wireless communications devices 2105 and 2106 are served by base station 2102. Wireless communications device 2107 is served by base station 2104. Wireless communications device 2108 is served by base station 2103.

In one embodiment, wireless communication network 2100 is an OFDMA/MIMO system comprising base stations/access points (APs) 2102, 2103 and 2104, and a plurality of mobile stations, such as wireless stations 2101, 2105, 2106, 2107, and 2108. In the applications, each base station serves multiple wireless communications devices that periodically transmit packets. In some scenarios, huge number of wireless stations contenting for the wireless channel results in collisions, long transmission range leads to high interface spaces and short packets increase overhead caused by headers. In one novel aspect, downlink transmissions to multiple wireless stations using MIMO and/or OFDMA are aggregated. When there is a downlink packet to be sent from a base station to a mobile station, data frames from different mobile stations meeting certain criteria are aggregated using OFDMA and transmitted together. In another novel aspect, multi-user OFDMA is used for uplink transmission. A network entity, such as a wireless controller 2109 is connected with base stations such as base stations 2102, 2103, and 2104, via links of 2116, 2117, and 2118.

FIG. 18 further shows simplified block diagrams of wireless stations 2101 and base station 2102 in accordance with the current invention.

Wireless communication station 2102 has an antenna 2126, which transmits and receives radio signals. A RF transceiver module 2123, coupled with the antenna, receives RF signals from antenna 2126, converts them to baseband signals and sends them to processor 2122. RF transceiver 2123 also converts received baseband signals from processor 2122, converts them to RF signals, and sends out to antenna 2126. Processor 122 processes the received baseband signals and invokes different functional modules to perform features in base station 2102. Memory 2121 stores program instructions and data 2124 to control the operations of base station 2102. Base station 2102 also includes a set of control modules, such as UL MU handler 2125 that carry out functional tasks to communicate with wireless communications devices.

Wireless communications device 2101 has an antenna 2135, which transmits and receives radio signals. A RF transceiver module 2134, coupled with the antenna, receives RF signals from antenna 2135, converts them to baseband signals and sends them to processor 2132. RF transceiver 2134 also converts received baseband signals from processor 2132, converts them to RF signals, and sends out to antenna 2135. Processor 132 processes the received baseband signals and invokes different functional modules to perform features in mobile station 2101. Memory 2131 stores program instructions and data 2136 to control the operations of mobile station 2101.

Wireless communications device 2101 also includes a set of control modules that carry out functional tasks. A downlink MIMO/OFDMA handler 191 handles downlink data and control frames using MU-MIMO and/or OFDMA scheme. A UL MU handler 2192 handles uplink responding frames using OFDMA.

Figure 19:
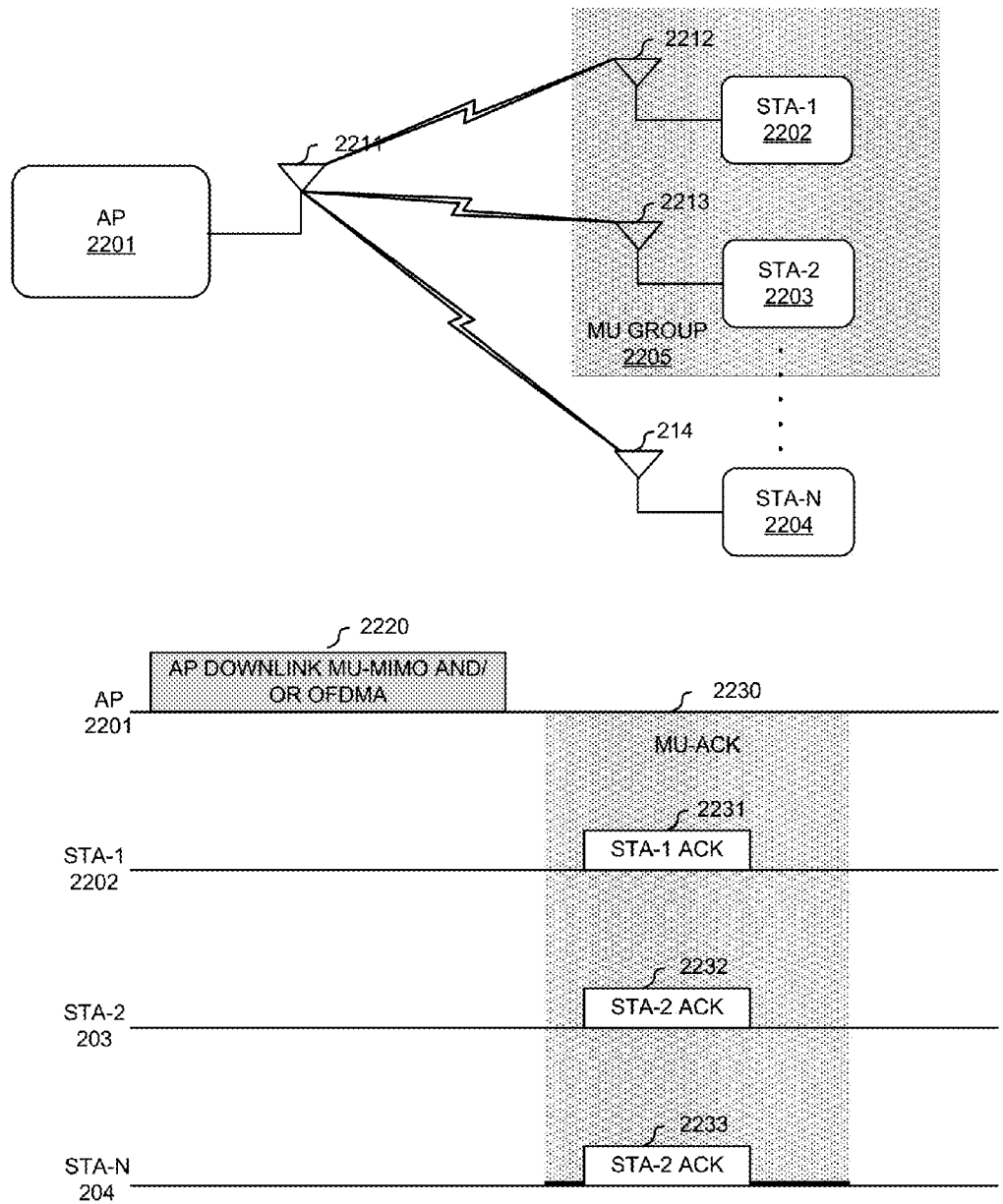
FIG. 19 illustrates an exemplary diagram in a wireless system with downlink MU-MIMO and/or OFDMA scheme and concurrent responding feedbacks in accordance with embodiments of the current invention.

FIG. 19 illustrates an exemplary diagram in a wireless system with downlink MU-MIMO and/or OFMDA scheme and concurrent responding feedbacks in accordance with embodiments of the current invention. An AP 2201, with antenna 2211 is configured to support downlink MU-MIMO and/or OFDMA and uplink OFDMA. Exemplary multiple mobile stations STA-1 2202, STA-2 2203 and STA-N 2204 connect to AP 2201 via antennas 2212, 2213 and 2214, respectively. In one embodiment, antennas 2211 to 2214, each is an antenna array in supporting of MIMO.

In one novel aspect, AP 2201 transmits downlink information with wideband comprising of a plurality of narrow band channels. AP 2201 transmits information to a plurality of wireless communications devices using MIMO and/or OFDMA. In one embodiment, AP 2201 receives uplink responding frames from the plurality of wireless communications stations concurrently using OFDMA. In one embodiment, AP 2201 exchanges capacity information with the plurality of wireless communications devices, such as STA-1 2202, STA-2 2203, and STA-N 2204. Based on the capacity information, uplink responding message can be sent concurrently using OFDMA or can be sent sequentially using AP polling.

FIG. 19 further illustrates the base station initiates MU operation in accordance to embodiments of the current invention. Multiple STAs STA-1 2202, STA-2 2203, and STA-N 2204 are connected with AP 2201. In one embodiment, the wireless communications devices receive downlink transmission from wireless stations, such as AP 2201, using MIMO or OFDMA scheme. In one embodiment, the downlink frames can be data transmission or control frames. In one example, STA-1 2202 and STA-2 2203 are configured to be in one MU group 2205. STA-N 2204 is in a different MU group based on the capacity information.

In one embodiment, the downlink frames can be data frames. At step 2220, AP 2201 transmits downlink data to STA-1 2202, STA-2 2203, and STA-N 2204, using MU-MIMO and/or OFDMA. In one embodiment, both MU-MIMO and OFDMA are used for the downlink transmission, with a first subset of wireless communications devices receiving MU-MIMO frames, while a second subset of wireless communications devices receiving OFMDA frames. In another embodiment, the AP transmits downlink data frames. In yet another embodiment, control frames are transmitted using MU-MIMO or OFDMA. In one embodiment, the control frames is the clear-to-send (CTS) message. Upon receiving the downlink frames, one or more wireless communications devices send responding messages using OFDMA. Each wireless communications device replies a responding message in different frequency band concurrently. As shown in FIG. 19, STA-1 2202, STA-2 2203 and STA-N 2204 respond with an ACK messages in different frequency bands concurrently at steps 2231, 22232, and 2233, respectively.

In one novel aspect, an indication is included to indicate the configuration for concurrent responding using uplink OFDMA. In one embodiment, an indication bit is included in the physical layer signal field (PHY SIG). The bandwidth assignment for the uplink responding frames can be included in PHY SIG field or be predefined or preconfigured. The preconfigured bandwidth is at least based on the number of wireless communications devices in the MU group. Upon detecting this indicator, the wireless communications devices start uses OFDMA for uplink responding messages. There are different configurations based on the number of wireless communications devices and the bandwidth of the uplink OFDMA channel.

Figure 20:
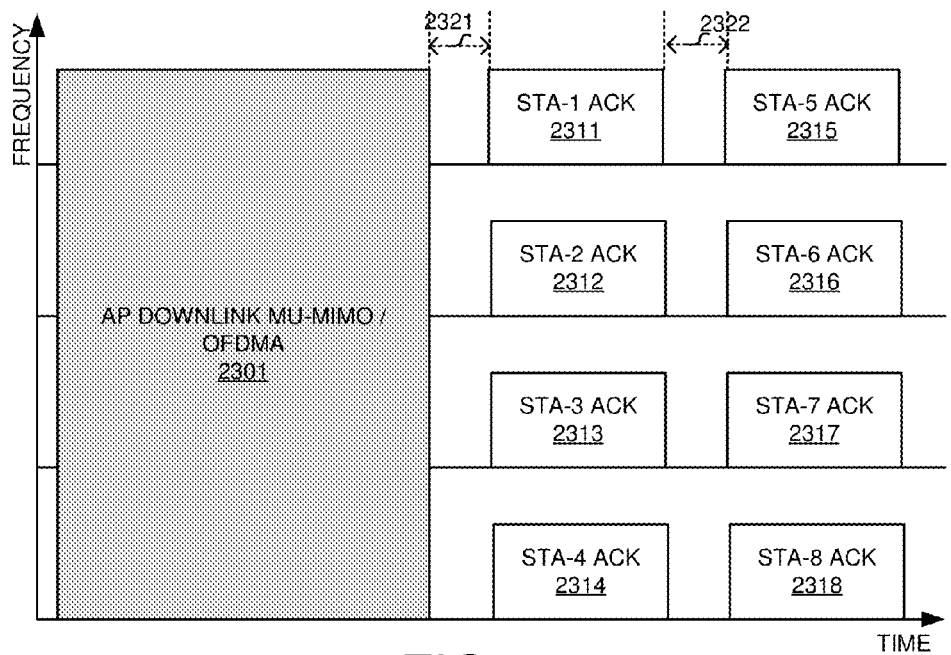
FIG. 20 shows an exemplary configuration for multiple wireless communications devices to send the corresponding responding frames concurrently over more than one transmission instances in accordance with embodiments of the current invention.

FIG. 20 shows an exemplary diagram for multiple wireless communications devices to send the corresponding responding frames concurrently over more than one transmission instances in accordance with embodiments of the current invention. At step 2301, the wireless communication station sends downlink wideband signal to multiple wireless communications devices, STA-1 to STA-8. In one example, the bandwidth needed for the responding message for each communications device is 20M. The total uplink OFDMA bandwidth is 80M. Therefore, there are total of four wireless communication devices can send the uplink responding frames concurrently. STA-1, STA-2, STA-3, and STA-4 are configured to be in the first subset to send their responding frames concurrently using uplink OFDMA at steps 2311, 2312, 2313, and 2314, respectively. STA-5, STA-6, STA-7, and STA-8 are configured to be in the second set to send their responding frames concurrently using uplink OFDMA at steps 2315, 2316, 2317, and 2318, respectively. Upon receiving the downlink frames, the first set of wireless communications devices back off for a short inter-frame space (SIFS) 2321. The first set of communications devices send their responding frames in different frequency band concurrently using OFDMA. The second set of wireless communications devices, after backing off for SIFS 2322, send their responding frames in different frequency band concurrently using OFDMA.

If the total bandwidth required to send responding frames from multiple wireless communication devices is greater than the available uplink OFDMA bandwidth, multiple OFDMA packets with SIFS spacing are used. In another embodiment, if the total bandwidth required sending responding frames from multiple wireless communication devices is greater than the available uplink OFDMA bandwidth, AP polls the second set of wireless communications devices for the second transmission instance.

Figure 21:
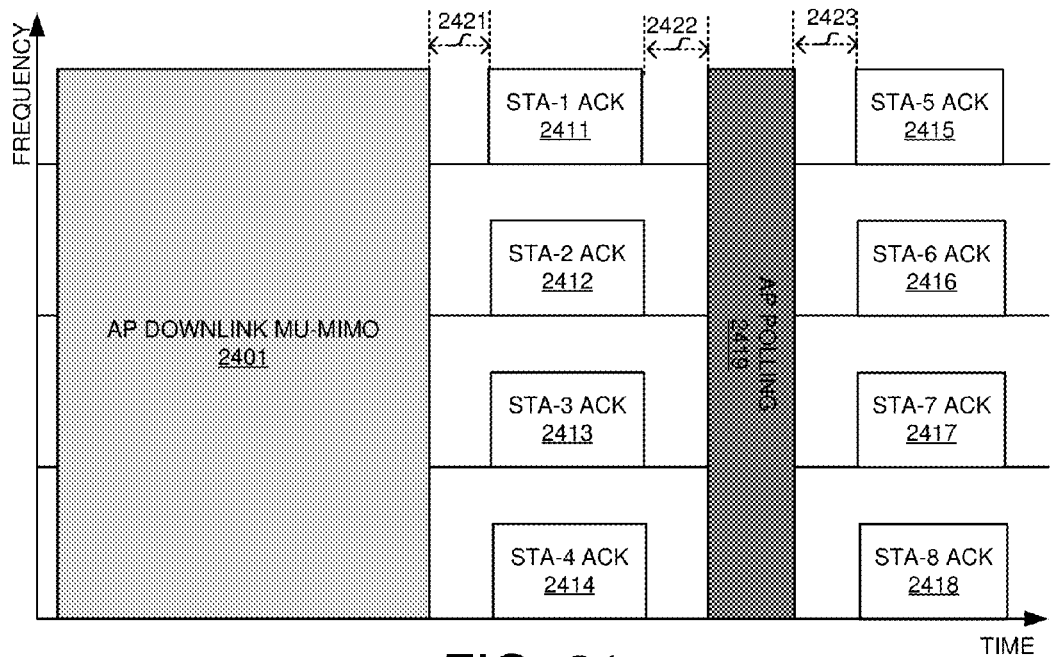
FIG. 21 shows and exemplary configuration for multiple wireless communications devices to send the corresponding responding frames concurrently over more than one transmission instances using AP polls in accordance with embodiments of the current invention.

FIG. 21 shows an exemplary diagram for multiple wireless communications devices to send the corresponding responding frames concurrently over more than one transmission instances using AP polls in accordance with embodiments of the current invention. At step 2401, the wireless communication station sends downlink wideband signal to multiple wireless communications devices, STA-1 to STA-8. As the uplink OFDMA bandwidth is smaller than the total bandwidth required for the responding frames, multiple transmission instances are used. STA-1, STA-2, STA-3, and STA-4 are configured to be in the first subset to send their responding frames concurrently using uplink OFDMA at steps 2411, 2412, 2413, and 2414, respectively. STA-5, STA-6, STA-7, and STA-8 are configured to be in the second set to send their responding frames concurrently using uplink OFDMA at steps 2415, 2416, 2417, and 2418, respectively. Upon receiving the downlink frames, the first set of wireless communications devices back off for a short inter-frame space (SIFS) 2421. The first set of communications devices send their responding frames in different frequency band concurrently using OFDMA. AP polling is used for the second set of the wireless communications devices. After SIFS 2422, AP polling for the second set of wireless communications devices at step 2419. The second set of wireless communications devices, after backing off for SIFS 2423, send their responding frames in different frequency band concurrently using OFDMA.

In another novel aspect, the wireless communications devices can be assigned to different MU group for uplink OFDMA transmission even when the uplink OFMDA has enough bandwidth for the responding frames.

Figure 22:
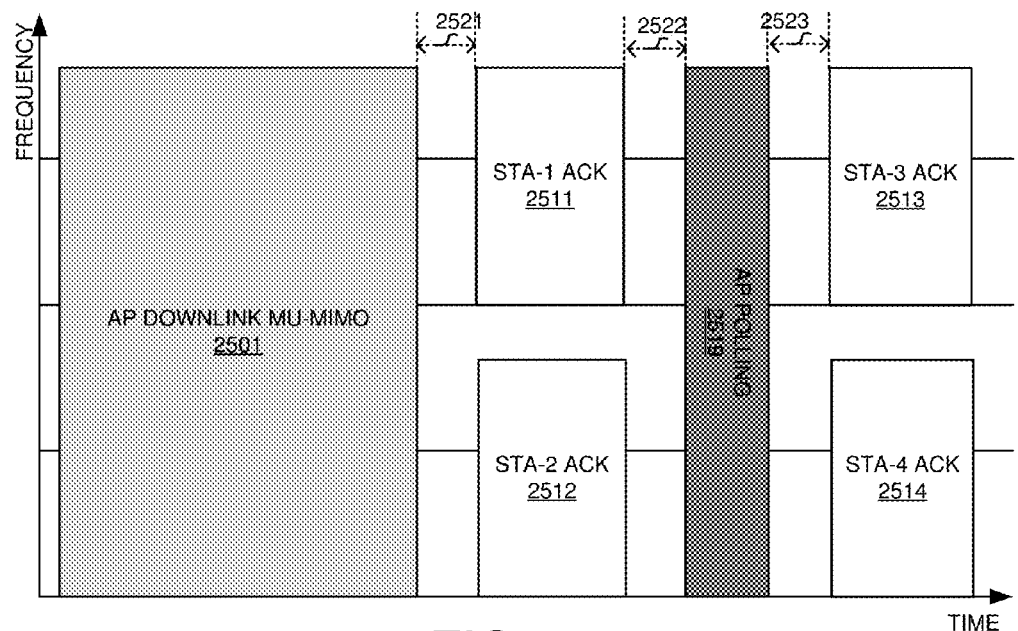
FIG. 22 shows an exemplary diagram for multiple wireless communications devices to send the corresponding responding frames concurrently over more than one transmission instances and at least one transmission instance has less than the maximum allowed wireless communications devices in accordance with embodiments of the current invention.

FIG. 22 shows an exemplary diagram for multiple wireless communications devices to send the corresponding responding frames concurrently over more than one transmission instances and at least one transmission instance has less than the maximum allowed wireless communications devices in accordance with embodiments of the current invention. At step 2501, the wireless communication station sends downlink wideband signal to multiple wireless communications devices, STA-1 to STA-4. Although the responding frames from STA-1 to STA-4 can fit in the bandwidth of the uplink OFDMA transmission, different configuration can be adopted. As shown, STA-1 and STA-2 are configured to be in the first subset to send their responding frames concurrently using uplink OFDMA at steps 511 and 2512, respectively. STA-3 and STA-4 are configured to be in the second set to send their responding frames concurrently using uplink OFDMA at steps 2513 and 2514, respectively. Upon receiving the downlink frames, the first set of wireless communications devices back off for a short inter-frame space (SIFS) 2521. The first set of communications devices send their responding frames in different frequency band concurrently using OFDMA. AP polling is used for the second set of the wireless communications devices. After SIFS 2522, AP polling for the second set of wireless communications devices at step 2519. The second set of wireless communications devices, after backing off for SIFS 2523, send their responding frames in different frequency band concurrently using OFDMA. In another embodiment, the second set of wireless communications devices can send their responding frames using OFDMA after SIFS without AP polls.

In other embodiments, the multiple responding frames from corresponding wireless devices may not occupy the entire uplink bandwidth. Different approaches are used for the unoccupied bandwidth. In one embodiment, the unoccupied bandwidth is left empty. In another embodiment, duplicated responding frames are used to occupy the unused bandwidth.

Figure 23A:
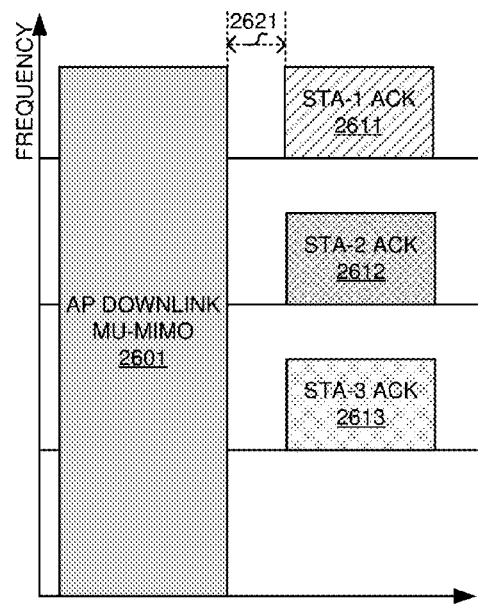
FIG. 23A shows an exemplary diagram for uplink responding frames using MU OFDMA by leaving the unoccupied bandwidth empty in accordance with embodiments of the current invention.

FIG. 23A shows an exemplary diagram for uplink responding frames using MU OFDMA by leaving the unoccupied bandwidth empty in accordance with embodiments of the current invention. At step 2601, the wireless communication station sends downlink wideband signal to multiple wireless communications devices, STA-1, STA-2, STA-3. Upon receiving the downlink frames, the wireless communications devices back off for a short inter-frame space (SIFS) 2621. STA-1, STA-2, and STA-3 send corresponding responding frames in different frequency bands concurrently at steps 2611, 2612, and 2613, respectively. The unoccupied bandwidth is left empty, leaving the bandwidth no energy.

Figure 23B:
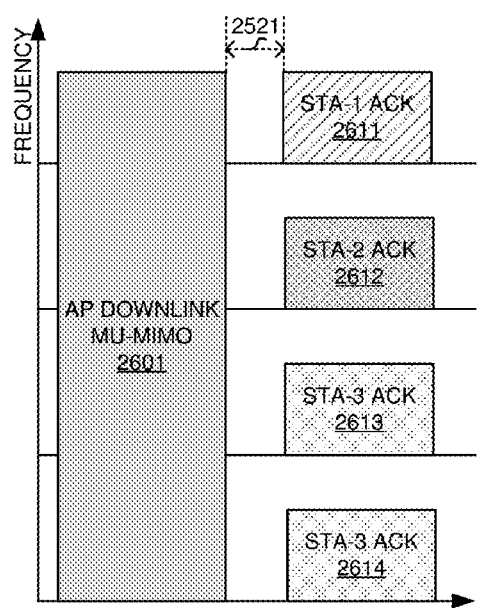
FIG. 23B shows an exemplary diagram for uplink responding frames using MU OFDMA by occupying the bandwidth with duplicated responding frames in accordance with embodiments of the current invention.

FIG. 23B shows an exemplary diagram for uplink responding frames using MU OFDMA by occupying the bandwidth with duplicated responding frames in accordance with embodiments of the current invention. At step 2601, the wireless communication station sends downlink wideband signal to multiple wireless communications devices, STA-1, STA-2, STA-3. Upon receiving the downlink frames, the wireless communications devices back off for a short inter-frame space (SIFS) 2621. STA-1, STA-2, and STA-3 send corresponding responding frames in different frequency bands concurrently at steps 2611, 2612, and 2613, respectively. The unoccupied bandwidth is filled with a duplicated responding frame from STA-3. In other embodiments, when there are multiple unoccupied frequency bands, one or more duplicated responding frames can be used to either entirely occupy the whole bandwidth or occupy a portion of the unoccupied bandwidth. The duplicated responding frame can be randomly picked. In other embodiment, the duplicated responding frames can be predefined or preconfigured.

Due to the rapid development of the technology, some wireless communications devices may not support the OFDMA. In other scenarios, sequential responding frames are preferred. In either of the cases, the mixed use of the sequential responding frame and the concurrent OFDMA responding frames is allowed.

Figure 24:
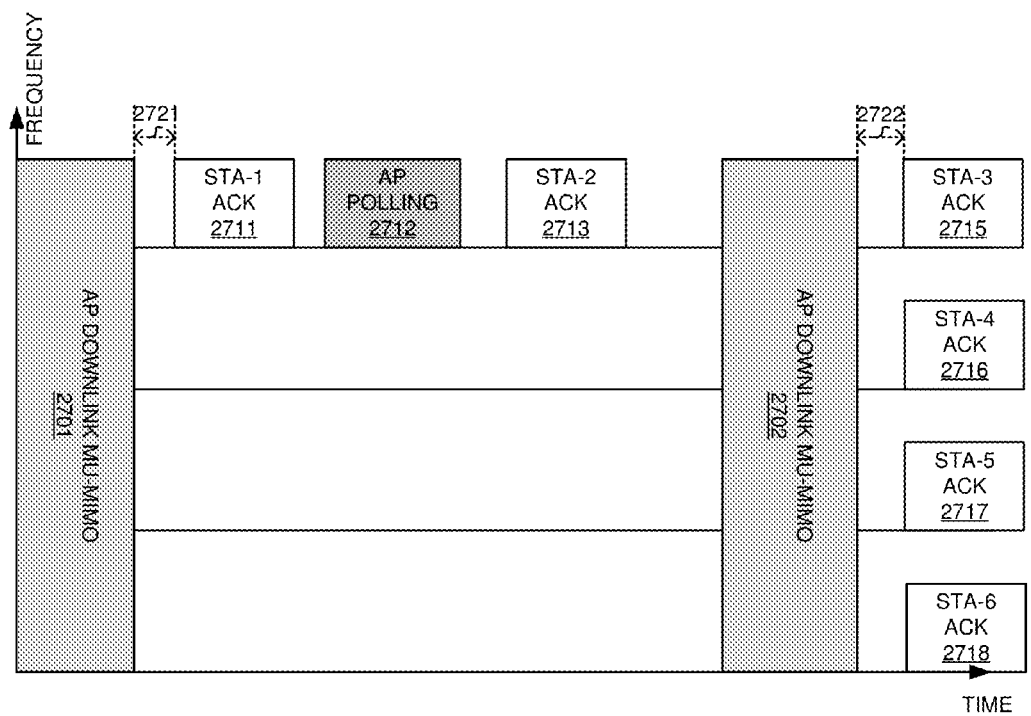
FIG. 24 shows an exemplary diagram of a mixed use the sequential responding frames and the concurrent OFDMA uplink responding frames in accordance with embodiments of the current invention.

FIG. 24 shows an exemplary diagram of a mixed use the sequential responding frames and the concurrent OFDMA uplink responding frames in accordance with embodiments of the current invention. At step 2701, the wireless communication station sends downlink wideband signal to multiple wireless communications devices, STA-1 and STA-2. STA-1 and STA-2 is setup to send responding frames sequentially. After SIFS 2721, STA-1 sends the responding frame step 2711. At step 2712, AP polls the other wireless communications devices for responses. At step 2713, STA-2 sends the responding frames in response to the AP polling. At step 2702 the wireless communication station sends downlink wideband signal to multiple wireless communications devices, STA-3, STA-4, STA-5, and STA-6. STA-3, STA-4, STA-5, and STA-6 are configured to send their responding frames concurrently using uplink OFDMA. After SIFS 2722, STA3, STA-4, STA-5, and STA-6 sends their corresponding responding frames at steps 2714, 2715, 2716, 2717 and 2718, respectively.

Figure 25:
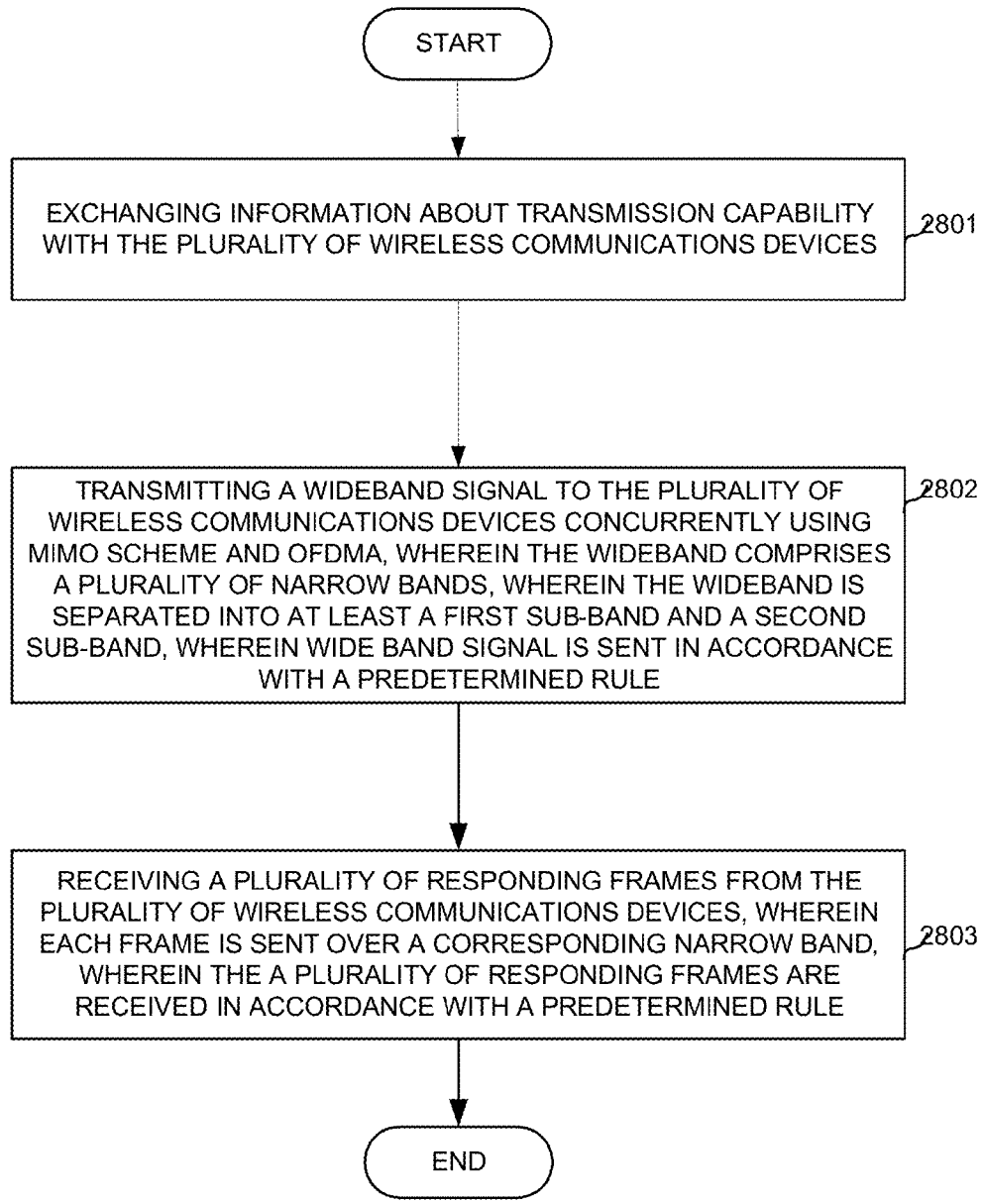
FIG. 25 shows an exemplary flow chart of a wireless station performs downlink MIMO/OFDMA with uplink MU responding frames using OFDMA in accordance with embodiments of the current invention.

FIG. 25 shows an exemplary flow chart of a wireless station performs downlink MIMO/OFDMA with uplink MU responding frames using OFDMA in accordance with embodiments of the current invention. At step 2801, the wireless station exchanges information about transmission capability with the plurality of wireless communications devices. At step 2802, the wireless station transmits a wideband signal to the plurality of wireless communications devices concurrently using MIMO scheme and OFDMA, wherein the wideband comprises a plurality of narrow bands, wherein the wideband is separated into at least a first sub-band and a second sub-band, wherein wide band signal is sent in accordance with a predetermined rule. At step 2803, the wireless station receives a plurality of responding frames from the plurality of wireless communications devices, wherein each frame is sent over a corresponding narrow band, wherein the a plurality of responding frames are received in accordance with a predetermined rule.

Figure 26:
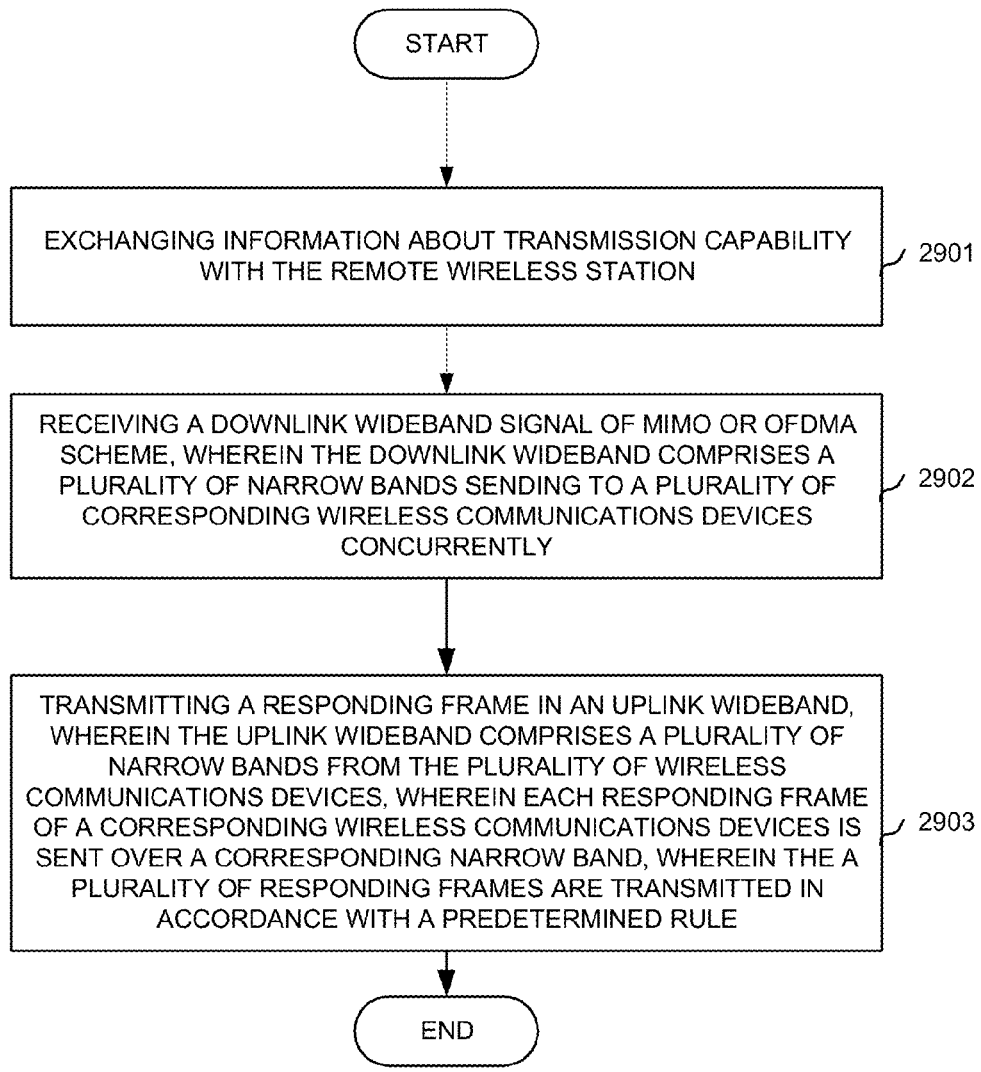
FIG. 26 shows an exemplary flow chart of a wireless communication device performs downlink MIMO/OFDMA with uplink MU responding frames using OFDMA in accordance with embodiments of the current invention.

FIG. 26 shows an exemplary flow chart of a wireless communication device performs downlink MIMO/OFDMA with uplink MU responding frames using OFDMA in accordance with embodiments of the current invention. The wireless communications device exchanges information regarding transmission capability with a remote wireless station at step 2901. At step 2902, the wireless communications device receives a downlink wideband signal of MIMO or OFDMA scheme, wherein the downlink wideband comprises a plurality of narrow bands sending to a plurality of corresponding wireless communications devices concurrently. At step 2903, the wireless communications device transmits a responding frame in an uplink wideband, wherein the uplink wideband comprises a plurality of narrow bands from the plurality of wireless communications devices, wherein each responding frame of a corresponding wireless communications devices is sent over a corresponding narrow band, wherein the a plurality of responding frames are transmitted in accordance with a predetermined rule.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   configuring a first number of downlink narrow bands for a downlink orthogonal frequency division multiple access (OFDMA) wideband channel by a wireless communication station in a wireless network;
   configuring a second number of downlink user channels, wherein each downlink user channel includes one or more configured downlink narrow bands, and wherein each user channel is associated with a corresponding transmitting (TX) user group with one or more wireless stations (STAs);
   generating downlink signaling fields for each user channel, wherein the signal fields include at least a SIG1 and a SIG2, and wherein at least one user channel is further divided in a frequency domain into multiple sub-bands, and wherein each sub-band forms a sub-band user channel associated with a user group; and
   transmitting concurrently downlink data frames to multiple STAs connected to the wireless communications station using the downlink OFDMA wideband channel, wherein each of the multiple STAs belongs to one of the user groups.

2. The method of claim 1, wherein each downlink user channel has independent SIG1 and SIG2 fields different from each other.

3. The method of claim 1, wherein the SIG1 of each user channel are the same containing common information for all user groups, and wherein the SIG2 of each user channel is independent containing user group specific information.

4. The method of claim 1, wherein at least one multi-band user channel is configured, wherein the multi-band user channel has more than one downlink narrow bands, and wherein the SIG1 and SIG2 of each narrow band in the multi-band user channel are duplicates.

5. The method of claim 1, wherein each downlink narrow band has a long training field (LTF), and wherein the LTFs for all downlink user channels in the downlink wideband channel are aligned in length.

6. The method of claim 5, wherein the SIG1 and SIG2 of each downlink user channel are the same containing common information for all user groups, and wherein the aligned LTF for each downlink user channel is followed by a SIG3 containing user group specific information.

7. The method of claim 1, wherein each sub-band user channel of the same downlink user channel shares the same SIG1 and SIG2.

8. The method of claim 1, wherein each sub-band user channel of the same downlink user channel shares the same SIG1, and wherein each sub-band user channel has different SIG2 containing user group specific information.

9. The method of claim 1, wherein each downlink user channel has independent modulation selecting from a group comprising: a single user (SU) with single input single output (SISO), a SU with multiple input multiple output (MIMO) with spatial division multiplexing (SDM), and a MU-MIMO with SDM.

10. The method of claim 1, wherein a station (STA) identifier (ID) is included in the downlink signaling field for SU-SISO and SU-MIMO user group, and wherein a group ID is included in the downlink signaling field for the MU-MIMO user group.

11. A method, comprising:
configuring a first number of downlink narrow bands for a downlink orthogonal frequency division multiple access (OFDMA) wideband channel by a wireless communication station in a wireless network;
configuring a second number of downlink user channels, wherein each downlink user channel includes one or more configured downlink narrow bands, and wherein each user channel is associated with a corresponding transmitting (TX) user group with one or more wireless stations (STAs);
generating downlink signaling fields for each user channel, wherein the signal fields include at least a SIG1 and a SIG2;
transmitting concurrently downlink data frames to multiple STAs connected to the wireless communications station using the downlink OFDMA wideband channel, wherein each of the multiple STAs belongs to one of the user groups;
receiving uplink OFDMA frames containing acknowledgement (ACK) packets for the downlink data frames from multiple STAs using an uplink wideband channel comprising the first number of uplink narrow bands, wherein each ACK packet is assigned to an uplink user channel comprising of one or more uplink narrow bands; and
decoding each ACK packet for corresponding STA.

12. The method of claim 11, wherein the uplink user channels and uplink user groups share the same configuration as the downlink user channels by default.

13. The method of claim 12, wherein the default configuration is override based on detected conditions comprising: a higher layer configuration, a message from a network entity, a user configuration, and an internal operation by the wireless communication station.

14. The method of claim 11, wherein the ACK packet for a STA has the same uplink narrow band assignment as corresponding downlink narrow band for the STA if the STA meets one of the conditions comprising: the STA belongs to a SU-SISO user group, the STA belongs to a MU-MIMO user group and the STA is the first station configured in a MU-MIMO user group.

15. The method of claim 11, wherein multiple ACK packets are configured for each STA in an MU-MIMO user group.

16. The method of claim 15, wherein the ACK packet for a STA is assigned to a first uplink OFDMA frame if the STA is the first station configured in the MU-MIMO user group, otherwise, the ACK packet is assigned to a second uplink OFDMA frame.

17. The method of claim 11, wherein one ACK packet is configured for all STAs in the same MU-MIMO user group, and wherein the ACK packet carries a group ID for the MU-MIMO user group.

18. The method of claim 11, wherein an assignment of the uplink user channel for each STA is included in the downlink signaling field.

19. The method of claim 18, wherein the downlink signaling fields include a sub_band_assignment bitmap indicating the narrow bands of the uplink wideband channel for the ACK packet.

20. The method of claim 18, wherein the downlink signaling fields include an ACK_order field indicating the order of the ACK packet when multiple ACK packets are required.

21. A method, comprising:
receiving orthogonal frequency division multiple access (OFDMA) data frames by a wireless communications device (STA) from a wireless communications station using a downlink wideband channel comprising a first number of narrow bands in a wireless network;
detecting a downlink user channel associating with the STA by decoding a station (STA) identifier (ID) if the STA belongs to a single user (SU) user group, otherwise, decoding a group ID, wherein the downlink user channel is configured with one or more narrow bands;
decoding downlink signaling fields and corresponding downlink data fields of detected downlink user channel, wherein the downlink signaling fields include at least a SIG1 and a SIG2;
generating an acknowledgment (ACK) packet for the received downlink data frames; and
selecting an uplink user channel for the ACK packet, wherein the uplink user channel comprises one or more narrow bands of an uplink wideband channel.

22. The method of claim 21, wherein the SIG1 contains common information for all user group, and wherein SIG2 contains user group specific information.

23. The method of claim 21, wherein the SIG1 and SIG2 of the detected user channel is independent of SIG1 and SIG2 of other downlink user channels in the downlink wideband channel.

24. The method of claim 21, wherein the uplink user channel is selected based on information in the downlink signaling field.

25. The method of claim 24, wherein the downlink signaling fields include a sub_band_assignment bitmap indicating the narrow bands of the uplink wideband channel for the ACK packet.

26. The method of claim 24, wherein the downlink signaling fields include an ACK_order field indicating the order of the ACK packet when multiple ACK packets are required.

* * * * *